United States Patent [19]
Harris et al.

[11] Patent Number: 6,126,986
[45] Date of Patent: Oct. 3, 2000

[54] PROCESS FOR FORMULATING A LIQUID ANIMAL FEED INGREDIENT CONTAINING SUGAR AND NEUTRALIZED CARBOXYLIC ACID

[75] Inventors: Joseph M. Harris, Woodlands; Paul Curtis Mostyn, Spring, both of Tex.

[73] Assignee: Westway Trading Corporation, New Orleans, La.

[21] Appl. No.: 09/255,350

[22] Filed: Feb. 23, 1999

[51] Int. Cl.$^7$ .................................................. A23K 1/02
[52] U.S. Cl. ........................................ 426/658; 426/807
[58] Field of Search ................................... 426/658, 807

[56] References Cited

U.S. PATENT DOCUMENTS

| | | | |
|---|---|---|---|
| 3,541,217 | 11/1970 | Marshall et al. | 424/326 |
| 3,928,576 | 12/1975 | Yoshida | 424/154 |
| 3,959,493 | 5/1976 | Baalsrod et al. | 426/2 |
| 4,199,606 | 4/1980 | Bland | 514/552 |
| 4,233,045 | 11/1980 | Fink | 426/335 |
| 4,285,974 | 8/1981 | Betz et al. | 426/2 |
| 4,376,790 | 3/1983 | Ames | 426/2 |
| 4,542,031 | 9/1985 | Nakajima et al. | 426/307 |
| 4,542,317 | 9/1985 | Palmquist et al. | 514/558 |
| 4,680,315 | 7/1987 | Bezzegh et al. | 514/738 |
| 4,804,547 | 2/1989 | Vanderbilt et al. | 426/74 |
| 4,824,686 | 4/1989 | Dunn et al. | 426/532 |
| 4,834,957 | 5/1989 | Van de Walle | 423/268 |
| 4,921,711 | 5/1990 | Kiefer et al. | 426/66 |
| 4,959,223 | 9/1990 | Van Ooyen | 426/2 |
| 5,001,143 | 3/1991 | Hokazono et al. | 514/430 |
| 5,077,068 | 12/1991 | Julien et al. | 426/309 |
| 5,087,472 | 2/1992 | Nissen | 426/623 |
| 5,182,126 | 1/1993 | Vinci et al. | 426/648 |
| 5,194,448 | 3/1993 | Coupland et al. | 514/558 |
| 5,250,714 | 10/1993 | Lajoie | 554/156 |
| 5,494,670 | 2/1996 | Wilkinson | 424/198.1 |
| 5,547,987 | 8/1996 | Bland et al. | 426/331 |
| 5,589,186 | 12/1996 | Isobe et al. | 424/438 |
| 5,656,309 | 8/1997 | Sawhill | 426/41 |
| 5,660,852 | 8/1997 | McKeown et al. | 424/438 |

FOREIGN PATENT DOCUMENTS

| | | |
|---|---|---|
| 781885 | 4/1968 | Canada . |
| 871640 | 5/1971 | Canada . |
| 1101263 | 5/1981 | Canada . |
| 1270690 | 6/1990 | Canada . |
| 2051422 | 3/1991 | Canada . |
| 2557884 | 7/1985 | France . |
| 2931617 | 2/1981 | Germany . |
| 4213175 | 10/1993 | Germany . |
| 46-016915b | 5/1971 | Japan . |
| 2102268 | 5/1982 | United Kingdom . |
| 2153670 | 1/1985 | United Kingdom . |

OTHER PUBLICATIONS

D.S. Kronfeld, "Homeosatic Disorders Associated with Lactation (Cattle, veterinary practices)," *Bovine Medicine and Surgery*, 1980, Am. Veterinary Publ., Santa Barbara, CA, pp. 537–596.

F.H. Fox, "Clinical Diagnosis and Treatment of Ketosis," *Journal of Dairy Science*, 1971, vol. 54, No. 6, pp. 974–978.

I.H. Scshultz, "Management and Nutritional Aspects of Ketosis,"*Journal of Dairy Science*, 1971, vol. 54, No. 6, pp.962–973.

Emmett N. Bergman, "Disorders Of Carbohydrate And Fat Metabolism", Swenson, Melvin J. (Ed.) *Dukes'Physiology Of Domestic Animals*, 1977, 9$^{th}$Ed. Comstock Publ. Assoc., Cornell Univ. Press, pp. 357–367.

R.A. Frobish and C.L. Davis, "Effects of Abomasal Infusions of Glucose or Sodium–Propionate on Milk Yield and Composition,"1975, *Jounral of Dairy Science*, 58 (5) 801.

B.F. Jenny and C.E. Polan, "Postprandial Blood Glucose and Insulin in Cows Fed High Grain," *Journal of Dairy Science*, 1975, vol. 58, No. 4, pp. 512–514.

Formatic Acid Plus Phytase for Pigs, *Feed Management*, Aug. 1998, vol. 49, No. 8, pp. 23, 24.

I.J. Lean, M.L. Bruss, R.L. Baldwin, H.F. Troutt, "Bovine Ketosis: A Review. I. Epidemiology and Pathogenesis," *Veterinary Bulletin*, 1991, vol. 61, No. 12, pp. 1209–1218.

(List continued on next page.)

*Primary Examiner*—Chhaya D. Sayala
*Attorney, Agent, or Firm*—Crutsinger & Booth

[57] ABSTRACT

The present invention provides a process that can utilize aqueous sugar-bearing sources, including food commodities, food-processing by-products, fermentation by-products, or other industrial by-products, in the making of a liquid animal feed ingredient that contains sugar and carboxylic acid salt. In general, the process according to the invention comprises mixing: (a) an aqueous sugar-bearing source characterized by having: (i) a total monosaccharide and disaccharide sugar content of at least 5.0 weight percent based on the amount of the aqueous sugar-bearing source, and more preferably, an invert sugar content of at least 5.0 weight percent based on the amount of the aqueous sugar-bearing source; and (ii) a water content of at least 10 weight percent; (b) carboxylic acid having in the range of 1–8 carbon atoms; and (c) inorganic base; wherein the step of mixing the carboxylic acid and the inorganic base is at least partially performed in the presence of the aqueous sugar-bearing source, and wherein the proportions of the aqueous sugar-bearing source, carboxylic acid, and inorganic base are selected such that: (i) the total monosaccharide and disaccharide sugar concentration is at least 3.0 weight percent of the resulting mixture; (ii) the carboxylic acid equivalent concentration is at least 0.5 equivalent per 1,000 g of the resulting mixture; (iii) the pH of the resulting mixture is at least 3.5; and (iv) the viscosity of the resulting mixture is less than about 40,000 centipoise when measured at about room temperature and at about standard atmospheric pressure. The inorganic base at least partially neutralizes the carboxylic acid to form the carboxylic acid salt in the resulting animal feed ingredient and the aqueous sugar-bearing source absorbs at least some of the heat of neutralization.

19 Claims, No Drawings

OTHER PUBLICATIONS

G. David Baird, "Research Papers–Primary Ketosis in the High–Producing Dairy Cow: Clinical and Subclinical Disorders, Treatment, Prevention and Outlook," *Journal of Dairy Science*, vol. 65, No. 1, 1982, pp. 1–10.

J.C. Bartley and A.L. Black, "Effect of Exogenous Glucose on Glucose Metabolism in Dairy Cows," *J. Nutrition*, 89: 66, pp. 317–328.

K.K. Park, L.J. Krysl, B.A. McCracken, M.B. Judkins, D.W. Holcombe, "Steers Grazing Intermediate Wheatgrass at Various Stages of Maturity; Effect on Nutrient Quality, Forage Intake, Digesta Kinetics, Ruminal Fermentation, and Serum Hormones and Metabolites," *Journal of Animal Science*, 1994, pp. 478–486.

T. Richard Houpt, "Stimulation of Food Intake in Ruminants by 2–deoxy–D–Glucose and Insulin," *American Journal of Physiology*, vol. 227, No. 1, Jul. 1974, pp. 161–167.

David A. Marshall, Richard L. Doty, "Taste Responses of Dogs to Ethylene Glycol, Propylene Glycol and Ethylene Glycol–Based Antifreeze," *Javma*, vol. 197, No. 12, Dec. 15, 1990, pp. 1599–1602.

David C. Dorman, Wanda M, Haschek, "Fatal Propylene Glycol Toxicosis in a Horse,"*Javmal*, vol. 198, No. 9, May 1, 1991, May 1, 1991, pp. 1643–1644.

L. J. Fisher, J. D. Erfle, G. A. Lodge and F. D. Sauer, "Effects of Propylene Glycol or Glycerol Supplementation of the Diet of Dairy Cows on Feed Intake, Milk Yield and Composition, and Incidence of Ketosis, "*Canadian Journal of Animal Science*, vol. 53, Jun. 1973, pp. 289–296.

D. C. Maplesden, "Propylene Glycol in the Treatment of Ketosis, "*Canadian Journal of Comparative Medicine*, vol. XVIII, No. 8, Aug. 1954, pp. 287–293.

R.S. Emery, Nancy Byurg, L.D. Brown, G. N. Blank, "Detection, Occurrence and Prophylactic Treatment of Borderline Ketosis with Propylene Glycol Feeding," Journal Article No. 3411 from the *Michigan Agricultural Experiment Station*, 1964, pp. 1074–1079.

P.J. Hanzlik, A. J. Lehman, W. Van Winkle, Jr. and N.K. Kennedy, "General Metabolic and Glycogenic Actions of Propylene Glycol and Some Other Glycols," Mar. 8, 1939, pp. 101–113.

P.W. Waldroup, T.E. Bowen, "Evaluation of Propylene Glycol as an Energy Source in Broiler Diets," Apr. 15, 1968, pp. 1911–1917.

P. Ferre, J. P. Pegorier, E.B. Marliss, J.R. Girard, "Influence of Exogenous Fat and Gluconeogenic Substrates on Glucose Homeostasis in the Newborn Rat,", Mar. 11, 1977, pp.E129–E136.

Dr. L.H. Schultz, "Relationship of Feeding to Ketosis in Dairy Cattle,"*Feedstuffs*, Oct.31, 1959.

D.R. Waldo, L.H. Schultz, "Blood and Rumen Changes Following the Intra–Ruminal Adminstration of Glycogenic Materials,"Dec. 4, 1959, pp. 496–505.

G.J. Ruegsegger, L.H. Schultz, Use of a Combination of Propylene Glycol and Niacin for Subclinical Ketosis, *Journal of Dairy Science*, vol. 69, No. 5, 1986, pp.1411–1415.

G.S. Dufva, E.E. Bartley, A.D. Dayton, D.O. Riddell,"Effect of Niacin Supplementation on Milk Production and Ketosis of Dairy Cattle," *Journal of Dairy Science*, vol. 66, No. 11, 1983, pp. 2329–2336.

Vaughn A. Studer, Ric R. Grummer, Sandra J. Bertics, Christopher K., Reynolds, "Effect of Prepartum Proplyene Glycol Adminstration on Periparturient Fatty Liver in Dairy Cows," *Journal of Dairy Science*, vol. 76, No. 10, 1993, pp. 2931–2939.

G. David Baird, Michael A. Lomax, Herbert W. Symonds, Stephen R. Shaw, Net Hepatic and Splanchnic Metabolism of Lactate, Pyruvate and Propionate in Dairy Cows in vivo in Relation to Lactation and Nutrient Supply, *Biochem Journal, Great Britain*, 1980, vol. 186, pp. 47–57.

L.J. Fisher, J.D. Erfle, F. D. Sauer, "Preliminary Evaluation of the Addition of Glucogenic Materials to Rations of Lactating Cows," *Canadian Journal of Animal Science*, vol. 51, Dec. 1971, pp. 721–727.

Robert B. Johnson, "The Treatment of Ketosis with Glycerol and Propylene Glycol,"Jul. 15, 1953, pp. 6–21.

F.D.Sauer, J.D. Erfle, L.J. Fisher, "Propylene Glycol and Glycerol as a Feed Additive for Lactating Dairy Cows:An Evaluation of Blood Metabolite Parmeters,"*Canadian Journal of Animal Science*, vol. 53, Jun. 1973, pp. 265–271.

Paavo Miettinen, "Propylene Glycol in Prevention of Bovine Ketosis," *Acta vet. scan. Suppl.* 89, 1993, pp. 135–136.

G.H. Schmidt, L. H. Schultz, "Effect of Feeding Sodium Propionate on Milk and Fat Production, Roughage Consumption, Blood Sugar and Blood Ketones of Dairy Cows, "Jul. 17, 1957, pp. 169–175.

L. H. Schultz, "Use of Sodium Propionate in the Prevention of Ketosis in Dairy Cattle,"Jul. 12, 1957, pp. 160–168.

Kronfeld and Chalupa, Sklan, "Ketosis, Lactational Efficiency and Feeding Fat," *Animal Nutrition & Health* Nov.–Dec. 1983, pp. 28–33.

Kauko Kauppinen, Yrjo Grohn, "Treatment of Bovine Ketosis and Invert Sugar, Glucocorticoids and Propylene Glycol," *Acta vet scand*, vol. 25, pp. 467–479.

R. R. Grummer, D. J. Carroll, "Effects of Dietary Fat on Metabolic Disorders and Reproductive Performance of Dairy Cattle," *Journal of Animal Science*, 1991, vol. 69, pp. 3838–3849.

A. Weirda, J. Verhoeff, J. Dorresteijn, T. Wensing, "Effect of Trenbolone Acetate and Proylene Glycol on Pregnancy Toxaemia in Ewes," *The Veterinary Record*, Mar. 16, 1985, vol. 116, pp. 284–287.

A. Weirda, J. Verhoeff, J. Dorresteijn, T. Wensing, S. van Dijk, "Effects of Two Glucocorticoids on Milk Yield and Biochemical Measurements in Healthy and Ketotic Cows," *Veterinary Record*, 1987, vol. 120, pp. 297–299.

D. Michael Rings, "Therapeutic Considerations in Ketosis and Hepatic Lipidosis Cattle," *Modern Veterinary Practice, Food Animal*, Aug. 1985, pp. 523–526.

J. F. Cote, "Bovine Ketosis: Principles of Therapy," *Canadian Veterinary Journal*, Jan, 1971, vol. 12, No. 1, pp.19–20.

Prof. Dr. David S. Kronfeld, Prof. Dr. Kraft Drepper, "Ketosis in High–Yielding Dairy Cows," *Verlag Paul Parey*, 1976, pp. 5–26.

Bruce F. Jenny, Carl E. Polan, Forrest W. Thye, "Effects of High Grain Feeding and Stage of Lactation on Serum Insulin, Glucose and Milk Fat Percentatge in Lactating Cows," *J. Nutr.*, vol. 104, Jul. 3, 1973, pp. 379–385.

C. Bjorkman, K. Forslund, P. Holtenius, G. Olsson, H. Wiktorrson,"A Comparative Study of Arterial and Venous Blood Acetate Concentration in Cows Fed Different Diets Close to Parturition," *Journal of Vet. Medicine*, 1992, vol. A 39, pp. 548–552.

Dr. Harold Radloff, "Proper Translation Feeding Reduces Metabolic Disorders," *The Dairyman*, Oct. 1993, pp. 25–27.

K.G. Hibbitt,"Bovine Ketosis and Its Prevention," *Veterinary Record*, Jul. 7, 1979, vol. 15pp. 13–15.

Michael A. Lomax, Iain A. Donaldson, Christopher I. Pogson, "The Effect of Fatty Acids and Starvation on the Metabolism of Gluconeogenic Precursors by Isolated Sheep Liver Cells," *Biochem.J., Great Britain*, 1986, vol. 240 pp. 277–280.

R. J. Aiello, L.E. Armentano, "Fatty Acid Effects on Gluconegenesis in Goat, Calf and Guinea Pig Hepatocytes," *Comp. Biochem. Physiol. Great Britain*, 1988, vol. 91B, No. 4, pp. 339–344.

Anne Faulkner, Helen T. Pollock, "Propionate Metabolism and Its Rgulation by Fatty Acids in Ovine Hepatocytes," *Comp. Biochem. Physiol., Great Britain*, 1986, vol. 84B, No. 4, pp. 559,562–563.

R. J. Aiello, L. E. Armentano, "Gluconeogenesi in Goat Hepatocytes is Affected by Calcium, Ammonia, and Other Key Metabolites but not Primarily through Cytosolic Redox State," *Comp. Biochem. Physiol, Great Britain*, 1987, vol. 88B, No. 1., pp. 93–201.

Prof. Dr. D. S. Kronfeld, "Spontaneous Bovine Ketosis," *Modern Veterinary Pratice*, Aug. 1970, pp. 30–34.

PROCESS FOR FORMULATING A LIQUID ANIMAL FEED INGREDIENT CONTAINING SUGAR AND NEUTRALIZED CARBOXYLIC ACID

TECHNICAL FIELD

The present invention provides a process that can utilize aqueous sugar-bearing sources, including food commodities, food-processing by-products, fermentation by-products, or other industrial by-products, in the making of a liquid animal feed ingredient that contains both sugar and substantially neutralized carboxylic acid.

BACKGROUND OF THE INVENTION

Sugars are of nutritional importance to both mono-gastric and ruminant animals. In recent years, researchers have been investigating sources for sugar, such as sugar-bearing industrial food processing by-products, fermentation by-products, or other by-products, for use in animal feed. In many cases, such sugar-bearing sources, such as cane molasses, have a high sugar content that can be used in animal feed formulations or supplements. Such sugar-bearing sources are usually liquids, and are easily handled by conventional mixing equipment in animal feed processing plants.

Small concentrations of carboxylic acids have traditionally been used as preservatives in animal feed products. Recent research efforts have indicated that, in sufficient concentrations, free formic acid is capable of providing equivalent performance benefits to those obtained from growth promoting antibiotics. See Peter Best and Clayton Gill, *Formic Acid Plus Phytase For Pigs*, FEED MANAGEMENT, August 1998, Volume 49, Number 8, pp. 23–24. For example, a concentration of about 6–8 kg of formic acid per metric ton of an animal feed of the complex European diet is recognized as providing such a benefit, which is about 0.13–0.17 equivalent of the formic acid per 1,000 g of animal feed. A concentration of about 8–10 kg of propionic acid per metric ton of animal feed is also expected to provide such a benefit, which is about 0.11–0.14 equivalent of the propionic acid per 1,000 g of animal feed. Somewhat lower dosages would be expected to be sufficient for a simpler maize-soya animal feed mixture of the type found in the United States.

Of course, to obtain a final animal feed product that has dosages of about 0.10 equivalent carboxylic acid per kilogram of the animal feed would be expected to require much higher concentrations of the carboxylic acid in a feed supplement or additive ingredient to be added the bulk feed mixture to obtain the animal feed product with the desired concentrations. For example, an animal feed supplement would typically be expected to be added to the bulk feed mixture (e.g., maize-soya) at the rate of about 2 weight percent up to about 10 weight percent.

Carboxylic acids are, of course, acidic by nature. Generally, the fewer carbon atoms in the carboxylic acid, the stronger the acidic property. Formic acid and other short-chain and cyclic carboxylic acids, that is, carboxylic acids having between 1 and 8 carbon atoms, are quite acidic. Longer-chain carboxylic acids, such as the $C_{14}$–$C_{22}$ fatty acids, tend to be much less acidic. Adding carboxylic acid, particularly the carboxylic acids having between 1 and 8 carbon atoms, to an aqueous feed mixture in an amount effective to achieve the desired effect tends to substantially lower the pH of the resulting composition. This can be a problem because conventional animal feed processing equipment is not designed for handling liquids that have an acidic pH value of less than about 3.5.

It would be desirable to provide an animal feed ingredient that included both the sugar source and the nutritive and other benefits of carboxylic acid. Furthermore, it would be desirable to have such a sugar-bearing feed ingredient that could be handled in conventional animal feed processing equipment.

SUMMARY OF INVENTION

According to the invention, an inorganic salt of a carboxylic acid is recognized to be substantially equivalent to the carboxylic acid in the aqueous environment of animal digestive tracts. Certain of the shorter chain carboxylic acids, such as formic acid and propionic acid, are also recognized to have some of the benefits of obtained by growth promoting antibiotics, thereby reducing the need for continuous administration of antibiotics to the animal. Other of the shorter chain carboxylic acids are expected to have this benefit, although perhaps to a lesser extent.

To solve the difficulties in handling aqueous compositions containing an effective concentration of carboxylic acid such that when the aqueous composition is added to or formulated with an animal feed the carboxylic acid is available for use by an animal, carboxylic acid salt expected to be an acceptable substitute that does not lower the pH of the aqueous composition.

From commercial sources, a carboxylic acid salt, however, tends to be relatively expensive compared to an equivalent amount of corresponding carboxylic acid. Thus, it would be commercially advantageous to find another way to produce a liquid sugar-bearing feed ingredient having an effective amount of a carboxylic acid salt.

The invention provides a process that utilizes an aqueous sugar-bearing source or sources, including food commodities, food-processing by-products, fermentation by-products, or other industrial by-products, in the making of a liquid sugar-bearing animal feed ingredient that contains carboxylic acid salt.

The process does not require the use of any carboxylic acid salt as a starting material, but instead forms the carboxylic acid salt by mixing carboxylic acid and inorganic base, which mixing is at least partially performed in the presence of the aqueous sugar-bearing source. The sugar-bearing source can serve two important functions. First, it can help suspend otherwise insoluble concentrations of the carboxylic acid and/or the salts thereof. Second, the mass balance of the starting materials is controlled such that most or all of the heat of neutralization is absorbed by the available materials of the mixture, including the aqueous sugar-bearing source, but without increasing the temperature to the point that the sugar might being to caramelize. Thus, the carboxylic acid salt does not have to be separately purchased or formulated, and by mixing in the presence of a sufficient amount of water (and other matter), at least part of which is already present in a suitable aqueous sugar-bearing source, the heat of neutralization between carboxylic acid and the inorganic base can be absorbed without adverse effects on the final liquid sugar-bearing animal feed ingredient obtained by the process.

The final sugar-bearing animal feed ingredient produced by the process is in a convenient liquid form for subsequent handling or processing, and the pH is controlled be at least about 3.5. More preferably, the pH is controlled to be between about 5.0 and 6.5, which is the pH range for many commercially available sugar-bearing sources, including food commodities, food-processing by-products, fermentation by-products, or other industrial by-products. At these pH ranges, the mixtures are much less corrosive to conventional animal feed processing equipment.

Another advantage of at least partially neutralizing the carboxylic acids is to reduce the volatility of the acids. For example, these acids have relatively low flashpoints, which can be a safety concern in animal feed processing plants and other situations. Another benefit of reducing the volatility of the acids is to reduce the odor of the feed ingredient, which can be unpleasant make an animal feed less palatable to the animal. This can be especially beneficial for the $C_1$–$C_4$ carboxylic acids, which, of course, are the more volatile carboxylic acids.

The resulting liquid sugar-bearing animal feed ingredient can then be used as an animal feed supplement or it can be used in the formulation of more complex animal feed compositions.

In general, the process according to the invention comprises mixing:
 (a) an aqueous sugar-bearing source characterized by having:
  (i) a total monosaccharide and disaccharide sugar content of at least 5.0 weight percent based on the amount of the aqueous sugar-bearing source; and
  (ii) a water content of at least 10 weight percent;
 (b) carboxylic acid having in the range of 1–8 carbon atoms; and
 (c) inorganic base;
wherein the step of mixing the carboxylic acid and the inorganic base is at least partially performed in the presence of the aqueous sugar-bearing source, and wherein the proportions of the aqueous sugar-bearing source, carboxylic acid, and inorganic base are selected such that:
 (i) the total monosaccharide and disaccharide sugar concentration is at least 3.0 weight percent of the resulting mixture;
 (ii) the carboxylic acid equivalent concentration is at least 0.5 equivalent per 1,000 g of the resulting mixture;
 (iii) the pH of the resulting mixture is at least 3.5; and
 (iv) the viscosity of the resulting mixture is less than about 40,000 centipoise when measured at about room temperature and at about standard atmospheric pressure.

More preferably, the process uses an aqueous sugar-bearing source having an invert sugar content of at least about 10 weight percent based on the amount of the aqueous sugar-bearing source, and further, the proportions are selected such that the invert sugar content it at least about 5 weight percent of the resulting mixture.

According to this process, the carboxylic acid is at least partially neutralized by the inorganic base in the presence of the aqueous sugar-bearing source to form the carboxylic acid salt in situ for the resulting animal feed ingredient. The aqueous sugar-bearing source provides at least part of the water necessary for the carboxylic acid neutralization and absorbs at least part of the heat of neutralization.

According to a further aspect of the invention, the carboxylic acid equivalent concentration that is expected to be neutralized with the inorganic base is preferably at most about 10 acid equivalents, and more preferably at most about 8.0 acid equivalents, per 1,000 grams of the total water content derived from all the starting materials used in the process. Thus, the heat of acid-base neutralization can be substantially absorbed by the available water content during the mixing process without causing the mixture to heat excessively and risk caramelizing the sugars in the mixture. This is particularly important for the strongest of the carboxylic acids.

Those skilled in the art will appreciate that after reading the following detailed description of the invention, the parameters of the invention can be defined in other units and terminology without departing from the scope and spirit of the invention. These and other aspects of the invention will be apparent to a person of ordinary skill in the art upon reading the following detailed description of a presently preferred embodiment and best mode of practicing the invention.

DETAILED DESCRIPTION OF PRESENTLY MOST PREFERRED EMBODIMENTS

AND THE BEST MODE OF PRACTICING THE INVENTION

The present invention will be described by referring to the general conditions for the process and to examples of how the invention can be made and used.

STARTING MATERIALS

As used herein, a "starting material" is any material or composition used in the process, including, for example, aqueous sugar-bearing source, carboxylic acid, and inorganic base. The term also includes any additional water or other material that is used in the mixing process.

As will be understood by those skilled in the art, of course, any starting material used in the process must be substantially free of any material that would be toxic to the type of animal at the concentrations it is intended to be fed to the animal or that any such toxic materials be rendered harmless in the process.

Aqueous Sugar-Bearing Sources

Suitable sugar-bearing sources can be found in food commodities, food-processing by-products, fermentation by-products, and other industrial by-products, and mixtures thereof. Of course, any combination of such sugar-bearing sources can be used in the process, depending on nutritive value, availability, cost, etc. Examples of such sugar-bearing sources from food processing sources include cane molasses, beet molasses, citrus molasses, starch molasses, soybean solubles, corn syrups, sorghum syrups, malto dextrins, liquid milk products and condensates, condensed whey products, fruit and vegetable extracts, condensed fermented corn extractives, concentrated separator by products of ion-diffusion separated beet molasses, concentrated steffens filtrate, citrus peel liquor, and any mixtures thereof. Examples of such sugar-bearing sources from fermentation by-products include brewers condensed solubles, condensed distillers solubles, alcohol production, condensed extracts from the fermentation of molasses and/or cereal grains or syrups derived from cereal grains that produce amino acids for commercial and food use, and mixtures thereof. Examples of such sugar-bearing sources from industrial by-products include wood molasses (hemicellulose extract) and lignin sulfonates solutions, and mixtures thereof. An alternative expression to describe suitable sugar sources is "molasses products" as defined by the Association of American Feed Control Officials. Additionally, other food processing and industrial by-products having sufficient sugar concentration can be used as sugar sources.

In general, these types of aqueous sugar-bearing sources are characterized by having:
 (i) a total monosaccharide and disaccharide sugar content of at least 5.0 weight percent based on the amount of the aqueous sugar-bearing source, and more preferably, an invert sugar content of at least 5.0 weight percent based on the amount of the aqueous sugar-bearing source; and (ii) a water content of at least 10 weight percent.

According to a presently most preferred embodiment of the invention, the aqueous sugar-bearing composition preferably contains at least 5 percent by weight total sugar as "invert sugar" content, which can be measured according to the Official Methods of Analysis of the Association of Analytical Chemists, Method No. 925.05, as known to those skilled in the art. In general, more concentrated sugar sources are preferred, such as condensed molasses solubles, which have an invert sugar concentration of about 10 percent by weight. Many sugar-bearing sources have higher concentrations of sugar, which can provide a more economical source for obtaining a high concentration of sugar in the animal feed ingredient. A lower sugar concentration can be somewhat compensated for, however, by the presence of other organic matter, such as other carbohydrates and protein.

If the desired sugar-bearing sources for use in the process have very high concentrations of sugar and not sufficient water for the process, additional water can be added to the sugar-bearing source and/or during the mixing process. Of course, one of the purposes of the present invention is to take advantage of readily available, cheap aqueous sugar-bearing sources for use in the animal feed product. If the quality of the aqueous sugar-bearing source is so high, the cost would also be expected to be higher, and the economic benefits of the invention may be lost.

Carboxylic Acid

As used herein, the term a "carboxylic acid" generally includes any of a broad array of organic acid compounds comprised of alkyl (hydrocarbon) groups (e.g, $CH_3$, $CH_2$), often, but not necessarily in a straight chin (aliphatic), and having one or more carboxy functional groups (typically represented as "—COOH" or "—$CO_2H$"). Also being considered aliphatic carboxylic acids are formic acid (HCOOH) and oxalic acid (HOOCCOOH). The number of carbon atoms in an aliphatic carboxylic acid ranges from one (formic) to 26 (cerotic), the carbon of the carboxyl functional group being counted as part of the aliphatic carbon chain. In general, carboxylic acids also include the large and important class of fatty acids. Carboxylic acids may be and may be saturated or unsaturated. There are also some natural aromatic carboxylic acids (e.g., benzoic, salicylic) as well as alicylic types (abietic, chaulmogric). As used herein, the term "a carboxylic acid," except as may otherwise be required from the particular context, includes combinations of two or more different carboxylic acids.

The characteristics of carboxylic acids and the selection of those that are the presently most preferred for use according to the present invention will hereinafter be discussed in more detail.

Inorganic Base

As used herein, "inorganic base" can be selected from the group consisting of: one or more Group I metal hydroxides, one or more of the Group II metal hydroxides, one or more of the Group I metal oxides, ammonium hydroxide, and any combination of the foregoing. For example, the inorganic base can be selected from the group consisting of: sodium hydroxide, magnesium hydroxide, potassium hydroxide, calcium hydroxide, ammonium hydroxide, magnesium oxide, calcium oxide, and any combination of the foregoing. Accordingly, as used herein, the term "carboxylic acid salt" and all like terms generally refer to a salt of the carboxylic acid that can be formed by one or more of the inorganic bases identified herein.

Calcium is a particularly valued nutritive element for an animal feed supplement. Unfortunately, as will hereinafter be discussed in detail, the calcium salts of carboxylic acids tend to be less soluble than the corresponding sodium salts, and therefore, obtaining the desired amount and proportion of calcium to sodium in the animal feed ingredient or supplement by way of carboxylic acid salts of the calcium inorganic base can be challenging.

Optional Ingredients in Aqueous Composition

According to another aspect of the invention, the aqueous sugar-bearing source may contain optional biologically active ingredients. Optional ingredients can include, for example, fats, vitamins, minerals, trace elements, veterinarian products for the prevention, control or eradication of disease, and growth stimulating factors. Sodium polyphosphate can be added as a powerful detergent and surfactant for the formulation. Such optional ingredients for use in the aqueous mixing process and inclusion in the resulting animal feed ingredient of the process can be added without departing from the scope and spirit of the present invention.

MIXTURES, LIQUID STATE, AND HEAT OF NEUTRALIZATION

As used herein, a "mixture" is any combination of starting materials formed during the mixing process, with the understanding the overall mixing step according to the process can be accomplished using various or preferred mixing sequences within the parameters of the process. Thus, the starting materials used in the process can be mixed step-wise to form one or more "intermediate" mixtures and the "final" mixture of the process.

Liquid State and Viscosity at Lower Temperature Ranges

As used herein, "liquid" is used according to its ordinary and accepted definition, which definition depends largely on viscosity measurements. The viscosity of a liquid tends to increase dramatically with decreasing temperature of the liquid, so the viscosity at lower temperatures is expected to be a limiting factor on whether the material is sufficiently fluid for use in conventional animal feed processing and handling equipment.

It is an objective of the invention to produce a sugar-bearing animal feed ingredient product that remains in a liquid state in the lower temperature range of use during ordinary stages of handling, processing, storing, and shipping. (Of course, pressure is also a factor in controlling the physical state of a material, but ordinarily the pressure on the feed ingredient is expected to be at least ambient atmospheric pressure, i.e., 760 mmHg). More particularly, the objective is to produce a sugar-bearing animal feed ingredient that remains in a desired liquid state at temperatures at least as low as room temperature (i.e., 72° F. or 22° C.), and more preferably at lower temperatures. Of course, an aqueous sugar-bearing mixture would be expected to begin to become undesirably viscous or freeze at or about the freezing point of water, but it is not necessary for the mixture to remain in a liquid state at such low temperatures.

According to the invention, the viscosity of the final liquid sugar-bearing animal feed ingredient produced according to the invention is less than about 40,000 centipoise when measured at about room temperature (i.e., 72° F. or 22° C.) and at about standard atmospheric pressure (i.e., 760 mmHg). This viscosity range facilitates liquid handling of the material at least as low as room temperature. According to a more preferred aspect of the invention, the viscosity of the final liquid sugar-bearing animal feed ingredient produced according to the invention is less than about 40,000 centipoise when measured at a colder temperature of 40° F. or 4° C. and at standard atmospheric pressure (i.e., 760 mmHg). This viscosity range facilitates liquid handling of the material toward the lower end of the normal temperature range expected to be encountered in animal feed processing and handling.

According to the invention, it is also strongly preferred, but not necessarily required depending on the processing plant mixing equipment, that any intermediate mixture formed with the aqueous sugar-bearing source during the process also remain in a liquid state, and more preferably having a viscosity of less than about 40,000 centipoise when measured at room temperature (i.e., 72° F. or 20° C.) and at standard atmospheric pressure (i.e., 760 mmHg). Preferably, any intermediate mixture formed during the process has a viscosity of less than about 40,000 centipoise when measured at a colder temperature of 40° F. or 4° C. at standard atmospheric pressure (i.e., 760 mmHg). This viscosity range facilitates liquid handling of the intermediate mixture during any stage of the process, even when the process conditions are toward the lower end of the normal temperature range expected to be encountered in animal feed processing and handling. The viscosity of certain mixtures during the process may not be a limitation on the liquid handling and processing, however, because at least the heat of neutralization between the carboxylic acid and the inorganic base is expected to increase the temperature of any mixture of these two starting materials during the process. Normally, it would not be unless and until the mixture is cooled to room temperature or below that the viscosity might increase beyond desirable material handling limits.

Aqueous Solubility of Carboxylic Acid and Salts Thereof and Impact on Viscosity

The solubility of a material in pure water is not necessarily the whole story regarding how the material will affect the viscosity of a complex mixture. For example, the known solubilities of many of the carboxylic acids and the sodium and calcium salts thereof in pure water would indicate that the acids could not be mixed in an aqueous solution or that the salts thereof would fall out of solution at any concentration above the known solubility of the material. As will hereinafter be discussed in detail, however, one of the advantages of the invention is to use the aqueous sugar source, which is usually a complex matrix of materials, to maintain super concentrations of the carboxylic acid, the inorganic base, and/or the carboxylic acid salt in suspension in the complex mixture. So long as there is sufficient water in the mixture to prevent the mixture from becoming excessively thick, that is, excessively viscous, super concentrations of these materials can be used.

Absorption of Heat of Neutralization (and Heat of Solution) and Upper Temperature Limits As will be understood by those skilled in the art, mixing an acid and a base results is usually an exothermic reaction. The heat energy released by an acid-base reaction is sometimes particularly referred to as a heat of neutralization. This release of heat energy causes the temperature of the mixture to increase, and if uncontrolled the release of the heat of neutralization can cause an aqueous mixture to heat to the boiling and even be dangerous. According to the invention, it is the objective to have the starting materials used in the process absorb most or all of the heat of neutralization between the carboxylic acid and the inorganic base without adverse effect on the liquid sugar-bearing animal feed ingredient produced by the process of the invention.

Furthermore, depending on the particular inorganic base used in the process and whether it is pre-dissolved in water, the heat of solution produced by dissolving the inorganic base in water or in directly in the aqueous sugar solution can also be a substantial source of heat that may need to be absorbed during the process. According to a further aspect of the invention, the starting materials used in the process can be used to absorb most or all of the heat of solution involved in dissolving the inorganic base in water.

In addition, the strongest carboxylic acids, formic and acetic acid, have strongly exothermic heats of solution. The rest of the carboxylic acids tend to have small or even endothermic heats of solution.

There are, however, at least two practical limits on allowing the starting materials absorb the heat of neutralization and the heat of solution.

A first limiting factor on allowing the aqueous sugar-bearing source and any mixture formed with the sugar-bearing source to be heated is the tendency of sugar to caramelize at elevated temperatures. Caramelization of sugar is a type of browning reaction that occurs during exposure of sugar to heat, which is evidenced by a browning color. Caramelization does not necessarily occur at a sharply defined temperature or after a specific time of exposure to that temperature, but tends to occur gradually over several hours. Of course, the rate of caramelization substantially increases with increasing temperature. For example, caramelization may begin to be observable after exposure to a temperature of about 165° F. or 74° C. for several hours, but proceeds much more rapidly at higher temperatures. According to the invention, the conditions of the process are controlled such that any mixture formed with the aqueous sugar-bearing source during the formulation process is maintained at a temperature below that at which the sugar used in the composition would begin to rapidly caramelize. Preferably, the aqueous sugar-bearing source and any mixture with the aqueous sugar-bearing source is not allowed to be heated above about 165° F. or 74° C.

A second limiting factor on allowing the temperature of any mixture formed during the process, and particularly the final mixture, is the objective of obtaining the final mixture in a liquid state, and more particularly meeting the desired viscosity limits. If the temperature of the starting materials or any mixture formed during the process becomes too hot, such that the mixture begins to rapidly evolve water or even boil, the water content of the final mixture would be reduced or substantially eliminated. If evaporation or boiling is uncontrolled, the result would be a mixture that is not suited for subsequent liquid handling and that may even be completely dry and friable.

According to the invention, the available heat capacity of the starting materials is sufficient to absorb most or all of the heat of neutralization between the carboxylic acid and the inorganic base without undesirably increasing the temperature above preferred limits. According to a further aspect of the invention, the available heat capacity of the starting materials is sufficient to also absorb most or all of the heat of solution produced by dissolving the inorganic base in water or in directly in the aqueous sugar solution.

The heat capacity of a material is usually expressed as the quantity of heat required to increase the temperature of a system or substance one degree of temperature. In the present system, the heat of neutralization, and optionally the heat of solution, to be absorbed by the system should not increase the temperature of the system above the preferred limits discussed above. Therefore, the lower the initial temperature of each of the starting materials, the greater the heat capacity within the preferred upper temperature limit for the system.

Of course, for ordinary material handling purposes, the initial temperature of each of the starting materials used in the process is sufficiently warm to prevent the starting material and the resulting mixture or mixtures with the starting materials from freezing or becoming undesirably viscous. The advantage the initial temperature of each of the starting materials being as low as possible while still maintaining the material in a liquid state (except for any solid inorganic base material) is that the lower initial temperature provides a larger available heat capacity to absorb the heat of neutralization, and, if applicable, the heat of solution of dissolving the base in water. The larger available heat capacity allowed by lower initial temperatures of the starting materials reduces the amount required, particularly the water component of the aqueous sugar-bearing solution, that is necessary to absorb these heats without increasing the temperature of any mixture during the process so much as to cause rapid evaporation or boiling. Thus, a final liquid animal feed mixture can be obtained having a higher concentration of sugar and carboxylic acid salt. An animal feed mixture having higher concentrations of sugar and/or carboxylic acid salt can be desirable for numerous reasons, such as reducing the volumes required in subsequent formulation processes and allowing for the shipping of a more concentrated liquid product that does not have unnecessary water content.

It is anticipated that the process according to the present invention is to be performed under the reasonably economical conditions. Unless required by local weather conditions, the process is anticipated to be performed in a plant that may not be heated or cooled, and insofar as practical, the processing equipment may be substantially exposed to the local ambient weather temperatures. Of course, if the ambient temperatures are too low, warming or heating of the initial materials or processing equipment may be required to maintain the mixtures in a liquid state.

If the ambient temperatures are too high, compensating options include increasing the amount of water used in the process to provide additional heat capacity for absorbing the heat of neutralization. It is normally expected, however, that the initial temperatures of the starting materials and the processing equipment used in the process would be below about 100° F. or 38° C., depending on the geographical location of the processing plant. According to the invention, it is most preferable to avoid the use of costly heat exchanging equipment to absorb the heat of neutralization and/or heat of solution.

Expansion and Foaming

The volume of the mixture can also be a limiting factor on the industrial applicability of the process. On an industrial processing scale, the mixing equipment may involve batches of 4,000 gallons or more. If mixtures formed during the process expand or foam excessively, the process may become unsuitable for industrial application. Thus, the process of the invention is preferably adapted to minimize foaming and liquid volume expansion during the process.

Maintaining Acidic pH to Avoid Increasing Viscosity of Aqueous Sugar-Bearing Composition Another factor in maintaining the mixture or mixtures formed during the process in the preferred liquid state, however, is the solubility of the inorganic base in water, and more particularly, the solubility in the particular aqueous sugar-bearing composition and in the particular final mixture. For example, while sodium hydroxide is very soluble in water, calcium hydroxide is much less soluble, and the solubility of calcium hydroxide actually decreases with increasing water temperature. Calcium carboxylic acid salts, however, are generally much more soluble than calcium hydroxide. Thus, to maintain a mixture in the liquid state it is helpful to a maintain an acidic pH by avoiding a large excess of the inorganic base, especially when using calcium hydroxide. Magnesium hydroxide and other Group IIA elements would be expected to behave similarly or be even less soluble in this situation. Calcium hydroxide is the presently most preferred inorganic base for use in the process because of the nutritive value of calcium in an animal feed supplement.

Accordingly, the amount of inorganic base is preferably limited to a stoichiometric proportion relative to the carboxylic acid, whereby there is at most a small excess of the inorganic base relative to the carboxylic acid. Of course, there may be other acidic matter "naturally" occurring in the particular aqueous sugar-bearing source used in a particular process, in which case some additional inorganic base may be used, for example up to about 1.1 stoichiometric excess, provided that the resulting animal feed ingredient preferably not basic, i.e., having a pH of at most 7.0.

REPRESENTATIVE FORMULATION EXAMPLES

Thirteen different test formulations were developed for the testing of the invention for making a liquid animal feed ingredient containing sugar and neutralized carboxylic acid.

A first test series was designed to probe the differences between the carboxylic acids at 20% weight percent concentration in the formulation. For this first test series, the proportions of the starting materials were selected according to the following general formulation:

(a) 20 weight percent of a carboxylic acid;
(b) an inorganic base in a stoichiometric proportion between about 0.75 and 1.1, where:
  (1) one-half the stoichiometric proportion is sodium hydroxide; and
  (2) one-half the stoichiometric proportion is calcium hydroxide; and
(c) an aqueous sugar source, where the total amount of water obtained from the aqueous sugar-bearing source and any other sources of water is calculated to yield a composition of about 65 weight percent total dry matter and about 35 weight percent total water.

Each of the following carboxylic acids was tested according to this first series: formic acid, acetic acid, propionic acid, fumaric acid, benzoic acid, and hydrolized vegetable oil. The hydrolized vegetable oil was included to provide additional data regarding the invention.

A second test series was designed to probe the differences between the high and low carboxylic acid concentrations vs. high and low sugar concentrations in the formulation. For this second test series, the proportions of the starting materials were selected according to the following general formulation:

(a) 5 or 25 weight percent of carboxylic acid;

(b) an inorganic base in a stoichiometric proportion between about 0.75 and 1.1, where:
  (1) one-half the stoichiometric proportion is sodium hydroxide; and
  (2) one-half the stoichiometric proportion is calcium hydroxide; and (c) an aqueous sugar source, where the total amount of water obtained from the aqueous sugar-bearing source and any other sources of water is calculated to yield a composition of about 53–70 weight percent total dry matter and about 30–47 weight percent total water.

Each of the following carboxylic acids was tested according to this second test series: propionic acid, maleic acid, and fumaric acid.

The compositions according to these two series of test formulations, including the calculated composition of the resulting mixtures, are shown across TABLES Ia and Ib. The test formulations are arranged across the tables in order of the number of carbons in the carboxylic acid, that is, $C_1$–$C_6$, with the hydrolized vegetable oil composition last.

As used in Tables Ia and Ib, all weights are in weight percent, acid or salt "equivalents" is sometimes abbreviated to "equ", "Formula" or "Forms" indicates the total formula composition, by way of example, the description "Formula 'Acid' H2O wt %" indicates the amount of water, if any, in the total formula derived from the acid source used in the formula; and "part H2O" indicates the water derived from all sources except the aqueous sugar-bearing source, including water from the acid source, NaOH source, and added water. For the purpose of facilitating the computation of the degree of super concentrations in the later Tables, miscibility of an carboxylic acid in water is numerically represented as 1,000 g/100 g water, and complete insolubility of the hydrolyzed vegetable oil is numerically represented as 0.01 g/100 g water. The solubilities of sodium propionate and sodium maleate are not readily available to the inventors, but roughly estimated as being 100 g/100 g water and 5 g/100 g water, respectively.

TABLE Ia

| Carboxylic Acid | formic | acetic | propionic | propionic | propionic | propionic | propionic |
|---|---|---|---|---|---|---|---|
| Acid-Sugar Test Concentrations | 20%-HI | 20%-HI | 5%-LO | 5%-HI | 20%-HI | 25%-LO | 25%-HI |
| Acid Solubility g/100 g $H_2O$ | 1000.00 | 1000.00 | 1000.00 | 1000.00 | 1000.00 | 1000.00 | 1000.00 |
| NaAcid Salt Sol. g/100 g $H_2O$ | 97.00 | 119.00 | 100.00 | 100.00 | 100.00 | 100.00 | 100.00 |
| CaAcid Salt Sol. g/100 g $H_2O$ | 16.00 | 37.00 | 49.00 | 49.00 | 49.00 | 49.00 | 49.00 |
| Acid M.W. g/mole | 46.03 | 60.05 | 74.08 | 74.08 | 74.08 | 74.08 | 74.08 |
| Acid Source Purity wt % | 95.00 | 56.00 | 100.00 | 100.00 | 100.00 | 100.00 | 100.00 |
| Acid Source $H_2O$ wt % | 5.00 | 44.00 | 0.00 | 0.00 | 0.00 | 0.00 | 0.00 |
| Formula Acid Source wt % | 21.05 | 35.71 | 5.00 | 5.00 | 20.00 | 25.00 | 25.00 |
| Formula "Pure" Acid wt % | 20.00 | 20.00 | 5.00 | 5.00 | 20.00 | 25.00 | 25.00 |
| Formula "Acid" $H_2O$ wt % | 1.05 | 15.71 | 0.00 | 0.00 | 0.00 | 0.00 | 0.00 |
| Formula Acid equ./1000 g Form. | 4.35 | 3.33 | 0.67 | 0.67 | 2.70 | 3.37 | 3.37 |
| Formula 50% NaOH source wt % | 17.39 | 13.24 | 2.70 | 2.70 | 10.80 | 13.50 | 13.50 |
| Formula "Pure" NaOH wt % | 8.69 | 6.62 | 1.35 | 1.35 | 5.40 | 6.75 | 6.75 |
| Formula NaOH equ./1000 g Form. | 2.17 | 1.66 | 0.34 | 0.34 | 1.35 | 1.69 | 1.69 |
| Formala "NaOH" $H_2O$ wt % | 8.69 | 6.62 | 1.35 | 1.35 | 5.40 | 6.75 | 6.75 |
| Formula $CaOH_2$ wt % | 8.04 | 6.12 | 1.50 | 1.50 | 5.00 | 7.50 | 7.50 |
| Formula $CaOH_2$ equ./1000 g Form. | 2.17 | 1.65 | 0.40 | 0.40 | 1.35 | 2.02 | 2.02 |
| Total Base Stoichiometry to Acid | 1.00 | 0.99 | 1.10 | 1.10 | 1.00 | 1.10 | 1.10 |
| "Added" $H_2O$ wt % | 16.22 | 2.40 | 0.82 | 8.94 | 18.35 | 12.06 | 13.11 |
| Formula "Non-Sugar" part $H_2O$ | 25.97 | 24.73 | 2.17 | 10.29 | 23.75 | 18.81 | 19.86 |
| "Salt" eq./1000 g part $H_2O$ | 16.73 | 13.38 | 31.10 | 6.56 | 11.37 | 17.94 | 16.99 |
| Sugar Source | Hvy. Mol. | Hvy. Mol. | CMS/Steep | Hvy. Mol. | Hvy. Mol. | CMS/Steep | Hvy. Mol. |
| Sugar Source D.M. wt % | 76.00 | 76.00 | 50.25 | 76.00 | 76.00 | 50.25 | 76.00 |
| Sugar Source Invert Sugar wt % | 48.68 | 48.68 | 9.05 | 48.68 | 48.68 | 9.05 | 48.68 |
| Sugar Source $H_2O$ wt % | 24.00 | 24.00 | 49.75 | 24.00 | 24.00 | 49.75 | 24.00 |
| Formula Sugar Source wt % | 37.30 | 42.52 | 89.98 | 81.86 | 45.86 | 41.94 | 40.89 |
| Formula "Sugar" $H_2O$ wt % | 8.95 | 10.21 | 44.77 | 19.65 | 11.01 | 20.87 | 9.81 |
| Calc. Formula Na wt % | 5.05 | 3.87 | 0.89 | 0.89 | 3.17 | 3.93 | 3.94 |
| Calc. Formula NaAcid Salt wt % | 14.78 | 13.58 | 3.24 | 3.24 | 12.97 | 16.21 | 16.21 |
| Calc. Formula Ca wt % | 4.68 | 3.67 | 1.41 | 1.40 | 3.07 | 4.40 | 4.41 |
| Calc. Formula CaAcid Salt wt % | 14.12 | 13.07 | 3.14 | 3.14 | 12.57 | 15.71 | 15.71 |
| Calc. Formula Crude Protein wt % | 2.59 | 2.96 | 8.48 | 5.69 | 3.19 | 3.95 | 2.84 |
| Calc. Formula Invert Sugar wt % | 18.16 | 20.70 | 8.14 | 39.85 | 22.32 | 3.50 | 19.90 |
| Calc. Dry Matter wt % | 65 | 65 | 53 | 70 | 65 | 60 | 70 |
| Calc. Total Water wt % | 35 | 35 | 47 | 30 | 35 | 40 | 30 |
| Calc. Acid equ./1000 g Total $H_2O$ | 12.4 | 9.5 | 1.4 | 2.3 | 7.8 | 8.5 | 11.4 |

TABLE Ib

| Carboxylic Acid | succinic | maleic | fumaric | fumaric | benzoic | Hyd. Veg. Oil |
|---|---|---|---|---|---|---|
| Acid-Sugar Test Concentrations | 20%-HI | 20%-HI | 5%-HI | 20%Hi | 20%-HI | 20%-HI |
| Acid Solubility g/100 g $H_2O$ | 6.00 | 79.00 | 0.70 | 0.70 | 0.34 | 0.01 |
| NaAcid Salt Sol. g/100 g $H_2O$ | 21.00 | 5.00 | 3.60 | 3.60 | 66.00 | 0.01 |
| CaAcid Salt Sol. g/100 g $H_2O$ | 0.20 | 2.90 | 2.10 | 2.10 | 2.70 | 0.01 |
| Acid M.W. g/mole | 118.09 | 116.07 | 116.07 | 116.07 | 122.13 | 284.50 |
| Acid Source Purity wt % | 100.00 | 100.00 | 100.00 | 99.00 | 100.00 | 95.00 |
| Acid Source $H_2O$ wt % | 0.00 | 0.00 | 0.00 | 1.00 | 0.00 | 0.00 |
| Formula Acid Source wt % | 20.00 | 20.00 | 5.00 | 20.20 | 20.00 | 25.00 |
| Formula "Pure" Acid wt % | 20.00 | 20.00 | 5.00 | 20.00 | 20.00 | 23.75 |
| Formula "Acid" $H_2O$ wt % | 0.00 | 0.00 | 0.00 | 0.20 | 0.00 | 0.00 |
| Formula Acid equ./1000 g Form. | 3.39 | 3.45 | 0.86 | 3.45 | 1.64 | 0.83 |
| Formula 50% NaOH source wt % | 9.40 | 9.50 | 2.70 | 13.79 | 6.53 | 0.00 |
| Formula "Pure" NaOH wt % | 4.70 | 4.75 | 1.35 | 6.89 | 3.26 | 0.00 |
| Formula NaOH equ./1000 g Form. | 1.18 | 1.19 | 0.34 | 1.72 | 0.82 | 0.00 |
| Formala "NaOH" $H_2O$ wt % | 4.70 | 4.75 | 1.35 | 6.89 | 3.26 | 0.00 |
| Formula $CaOH_2$ wt % | 5.20 | 5.30 | 1.50 | 6.38 | 3.03 | 2.64 |
| Formula $CaOH_2$ equ./1000 g Form. | 1.40 | 1.43 | 0.40 | 1.72 | 0.82 | 0.71 |
| Total Base Stoichiometry to Acid | 0.76 | 0.76 | 0.86 | 1.00 | 1.00 | 0.85 |
| "Added" $H_2O$ wt % | 25.46 | 25.46 | 22.10 | 17.80 | 19.21 | 22.51 |
| Formula "Non-Sugar" part $H_2O$ | 30.16 | 30.21 | 23.45 | 24.89 | 22.48 | 22.51 |
| "Salt" eq./1000 g part $H_2O$ | 8.55 | 8.67 | 3.17 | 13.84 | 7.27 | 3.17 |
| Sugar Source | Hvy. Mol. | Hvy. Mol. | Hvy. Mol. | Hvy. Mol. | Hvy. Mol. | Hvy. Mol. |
| Sugar Source D.M. wt % | 76.00 | 76.00 | 76.00 | 76.00 | 76.00 | 76.00 |
| Sugar Source Invert Sugar wt % | 48.68 | 48.68 | 48.68 | 48.68 | 48.68 | 48.68 |
| Sugar Source $H_2O$ wt % | 24.00 | 24.00 | 24.00 | 24.00 | 24.00 | 24.00 |
| Formula Sugar Source wt % | 39.94 | 39.74 | 68.70 | 41.84 | 51.23 | 49.85 |
| Formula "Sugar" $H_2O$ wt % | 9.58 | 9.54 | 16.49 | 10.04 | 12.29 | 11.96 |
| Calc. Formula Na wt % | 2.76 | 2.79 | 0.87 | 4.02 | 1.95 | 0.07 |
| Calc. Formula NaAcid Salt wt % | 9.52 | 9.50 | 2.70 | 13.79 | 11.76 | 0.00 |
| Calc. Formula Ca wt % | 3.14 | 3.19 | 1.31 | 3.80 | 2.03 | 1.80 |
| Calc. Formula CaAcid Salt wt % | 19.25 | 19.33 | 5.47 | 23.25 | 11.56 | 21.63 |
| Calc. Formula Crude Protein wt % | 2.78 | 2.76 | 4.78 | 2.91 | 3.56 | 3.47 |
| Calc. Formula Invert Sugar wt % | 19.44 | 19.35 | 33.44 | 20.37 | 24.94 | 24.27 |
| Calc. Dry Matter wt % | 60 | 60 | 60 | 10 | 65 | 66 |
| Calc. Total Water wt % | 40 | 40 | 40 | 35 | 35 | 34 |
| Calc. Acid equ./1000 g Total $H_2O$ | 8.5 | 8.7 | 2.2 | 9.9 | 4.7 | 2.4 |

REPRESENTATIVE MIXING SEQUENCES

According to the general process, the inorganic base at least partially neutralizes the carboxylic acid in the presence of the aqueous sugar-bearing source to form the carboxylic acid salt in the resulting animal feed ingredient. The water in the aqueous sugar-bearing source absorbs at least some of the heats of neutralization and solution involved in the process, minimizing or eliminating the need for heat exchanging equipment in an industrial scale process.

To demonstrate the efficacy of the inventive process and to determine the best mixing sequences, a bench scale study of six different mixing sequences was undertaken using several representative carboxylic acids. As will hereinafter be described in more detail, the first two of the six test mixing sequences are essentially control experiments for the invention, which probe the boundaries of separately mixing the carboxylic acid and inorganic base before adding any aqueous sugar-bearing source. The remaining four of the test mixing sequences probe the differences between the simplest of mixing strategies according to the invention. While further variation of the mixing sequence steps can be employed according to the principles of the invention, these six different sequences are more than sufficient to illustrate the invention.

According to a first sequence ("Mixing Sequence 1"), the mixing steps were performed as follows:
(a) adding all the base (first the aqueous NaOH solution, and then the CaOH) to the "added water" proportion of the test formula to obtain a base/water pre-mixture (having a slurry consistency);
(b) adding all the acid to the base/water pre-mixture to obtain a salt/water pre-mixture; and then
(c) adding all the aqueous sugar-bearing source to the salt/water pre-mixture.

The data obtained for each of the test formulations according to the tested Mixing Sequence 1 is conveniently presented in Tables II–1a and II–1b.

According to a second sequence ("Mixing Sequence 2"), the mixing steps were performed as follows:
(a) adding all the acid to the "added water" proportion of the test formula to obtain an acid/water pre-mixture,
(b) adding the CaOH to the aqueous NaOH solution to obtain a base mixture (having a pasty consistency) and then adding all the base mixture to the acid/water pre-mixture to obtain a salt/water pre-mixture; and then
(c) adding all the aqueous sugar-bearing source to the salt/water pre-mixture.

The data obtained for each of the test formulations according to the tested Mixing Sequence 2 is conveniently presented in Tables II–2a and II–2b.

According to a third sequence ("Mixing Sequence 3"), the mixing steps were performed as follows:
(a) adding all the base (first the aqueous NaOH solution, and then the CaOH) to the "added water" proportion of the test formula to obtain a base/water pre-mixture (having a slurry consistency),
(b) separately adding all the acid to the aqueous sugar-bearing source to obtain an acid/sugar source pre-mixture; and then
(c) adding all the acid/sugar source pre-mixture to the base/water pre-mixture.

The data obtained for each of the test formulations according to the tested Mixing Sequence 3 is conveniently presented in Tables II–3a and II–3b.

According to a fourth sequence ("Mixing Sequence 4"), the mixing steps were performed as follows:
(a) adding all the base (first the aqueous NaOH solution, and then the CaOH) to the "added water" proportion of the test formula to obtain a base/water pre-mixture (having a slurry consistency);
(b) separately adding all the acid to the aqueous sugar-bearing source to obtain an acid/sugar source pre-mixture; and then
(c) adding all the base/water pre-mixture to the acid/sugar source pre-mixture.

The data obtained for each of the test formulations according to the tested Mixing Sequence 4 is conveniently presented in Tables II–4a and II–4b.

According to a fifth sequence ("Mixing Sequence 5"), the mixing steps were performed as follows:
(a) adding all the acid to the "added water" proportion of the test formula to obtain an acid/water pre-mixture;
(b) separately adding all the base (first the aqueous NaOH solution, and then the CaOH) to the aqueous sugar-bearing source to obtain a base/sugar source pre-mixture; and
(c) adding all the acid/water pre-mixture to the base/sugar source pre-mixture.

The data obtained for each of the test formulations according to the tested Mixing Sequence 5 is conveniently presented in Tables II–5a and II–5b.

According to a sixth sequence ("Mixing Sequence 6"), the mixing steps were performed as follows:
(a) adding all the acid to the "added water" proportion of the test formula to obtain an acid/water pre-mixture;
(b) separately adding all the base (first the aqueous NaOH solution, and then the CaOH) to the aqueous sugar-bearing source to obtain a base/sugar source pre-mixture; and
(c) adding all the base/sugar source pre-mixture to the acid/water pre-mixture.

The data obtained for each of the test formulations according to the tested Mixing Sequence 6 is conveniently presented in Tables II–6a and II–6b.

As used in Tables II–1a through II–6b, "added water" refers to the amount of water added to the formula that is not derived from the acid source, the NaOH source, or the aqueous sugar-bearing source used in the formula; the word "concentration" is abbreviated to "conc"; the calculated extent of saturation or super saturation is determined by dividing the calculated concentration of a material divided the solubility of the material; and "cps" is an abbreviation for centipoise. Furthermore, each of the tests was pursued to conclusion unless and until it appeared at an earlier step to be totally unworkable. For example, while certain pre-mixtures became quite thick (viscous), the test was pursued unless the mixture became so thick as to be difficult or impossible to pump in conventional animal feed processing plant equipment.

All the observations at each step of each test were used to arrive at an overall observation of the test, such as "N/F" for not feasible, "POOR", "OK", or "WELL". For example, in Table II–3a, the overall Mixing Sequence 3 for Propionic 20%-HI and Propionic 25%-LO were rated "POOR" based on the high temperatures measured in the final mixing step, In Table II–3b, the overall observation for Succinic 20-HI is "POOR" based on the thickness of the acid/sugar source pre-mixture, even though the final mixing step otherwise proceeded well. Certain data was not measured for one reason or another, indicated by "N/M."

TABLE II-1a

| Carboxylic Acid | | formic | acetic | propionic | propionic | propionic | propionic | propionic |
|---|---|---|---|---|---|---|---|---|
| Acid-Sugar Test Concentrations | | 20%-HI | 20%-HI | 5%-LO | 5%-HI | 20%-HI | 25%-LO | 25%-HI |
| Mixing Sequence 1 | | | | | | | | |
| a. | Add base to "added water" | | | | | | | |
| | NaOH conc g/100 g $H_2O$ | 35 | 73 | 62 | 13 | 23 | 36 | 34 |
| | $CaOH_2$ conc g/100 g $H_2O$ | 32 | 68 | 69 | 15 | 21 | 40 | 38 |
| | Initial added water temp F. | 79 | 76 | 70 | 70 | 81 | 71 | 71 |
| | NaOH/added water temp F. | 126 | 108 | 96 | 92 | 105 | 118 | 120 |
| | Total base/added water temp F. | 77 | 109 | 85 | 93 | 105 | 106 | 122 |
| | NaOH/added water pH | 13.6 | 12.6 | 13.3 | 13.2 | 13.7 | 13.6 | 13.5 |
| | Total base/added water pH | 13.8 | 12.8 | 13.5 | 13.7 | 13.9 | 13.7 | 13.8 |
| | Observation(s) | SLURRY | SLURRY | SLURRY | SLURRY | SLURRY | SLURRY | SLURRY |
| b. | Add acid to base/added water | YES | YES | YES | YES | YES | YES | YES |
| | Acid conc g/100 g $H_2O$ | 77 | 81 | 230 | 49 | 84 | 133 | 126 |
| | Acid conc/solubility | 0.1 | 0.1 | 0.2 | 0.0 | 0.1 | 0.1 | 0.1 |
| | NaAcid salt conc g/100 g $H_2O$ | 57 | 55 | 149 | 32 | 55 | 86 | 82 |
| | NaAcid salt conc/solubility | 12.15 | 14.98 | 105.97 | 22.55 | 17.79 | 19.60 | 18.50 |
| | CaAcid salt conc g/100 g $H_2O$ | 54 | 53 | 145 | 31 | 53 | 84 | 79 |
| | CaAcid salt conc/solubility | 20.97 | 17.88 | 17.08 | 5.36 | 16.60 | 21.14 | 27.82 |
| | Final salt/added water temp F. | 212 | 212 | 164 | 146 | 155 | 161 | 192 |
| | Observation(s) | THICK VIOLENT | THICK SEVERE | THICK SEVERE | OK | THICK | THICK | THICK |
| c. | Add sugar source | NO | NO | NO | YES | NO | NO | NO |
| | Initial sugar source temp F. | N/A | N/A | N/A | 70 | N/A | N/A | N/A |
| | Initial sugar source pH | N/A | N/A | N/A | 5.7 | N/A | N/A | N/A |
| | Addition Time Minutes | N/A | N/A | N/A | 8 | N/A | N/A | N/A |

TABLE II-1a-continued

| Carboxylic Acid | formic | acetic | propionic | propionic | propionic | propionic | propionic |
|---|---|---|---|---|---|---|---|
| Final (Max) Product Temp F. | N/A | N/A | N/A | 84 | N/A | N/A | N/A |
| Final Product pH | N/A | N/A | N/A | 5.8 | N/A | N/A | N/A |
| Final Product Viscosity cps | N/A | N/A | N/A | 4040 @ 68 | N/A | N/A | N/A |
| Observation(s) | N/A | N/A | N/A | WELL | N/A | N/A | N/A |
| Overall Observation(s) | N/F | N/F | N/F | WELL | N/F | N/F | N/F |

TABLE II-1b

| Carboxylic Acid | succinic | maleic | fumaric | fumaric | benzoic | Hyd. Veg. Oil |
|---|---|---|---|---|---|---|
| Acid-Sugar Test Concentrations Mixing Sequence 1 | 20%-HI | 20%-HI | 5%-HI | 20%Hi | 20%-HI | 20%-HI |
| a. Add base to "added water" | | | | | | |
| NaOH conc g/100 g $H_2O$ | 16 | 16 | 6 | 28 | 15 | 0 |
| CaOH$_2$ conc g/100 g $H_2O$ | 17 | 18 | 6 | 26 | 13 | 12 |
| Initial added water temp F. | 68 | 78 | 80 | 71 | 71 | 70 |
| NaOH/added water temp F. | 91 | 91 | 92 | 91 | 102 | N/A |
| Total base/added water temp F. | 104 | 104 | 88 | 90 | 102 | 73 |
| NaOH/added water pH | 11.5 | 11.5 | 11.5 | 11.5 | 13.6 | N/A |
| Total base/added water pH | 13.5 | 13.5 | 13.5 | 13.5 | 13.8 | 12.7 |
| Observation(s) | SLURRY | SLURRY | SLURRY | SLURRY | SLURRY | SLURRY |
| b. Add acid to base/added water | YES | YES | YES | YES | YES | YES |
| Acid conc g/100 g $H_2O$ | 66 | 66 | 21 | 80 | 89 | 106 |
| Acid conc/solubility | 11.1 | 0.8 | 30.5 | 114.8 | 261.7 | 10551.3 |
| NaAcid salt conc g/100 g $H_2O$ | 32 | 31 | 12 | 55 | 52 | 0 |
| NaAcid salt conc/solubility | 10.05 | 9.85 | 8.82 | 14.58 | 25.81 | 0.00 |
| CaAcid salt conc g/100 g $H_2O$ | 64 | 64 | 23 | 93 | 51 | 96 |
| CaAcid salt conc/solubility | 22.98 | 23.15 | 4.88 | 32.11 | 14.44 | 27.72 |
| Final salt/added water temp F. | 143 | 142 | 118 | 165 | 106 | 76 |
| Observation(s) | THICK | THICK | WELL | THICK FOAM | THICK CAKE | THICK |
| c. Add sugar source | NO | NO | YES | NO | NO | NO |
| Initial sugar source temp F. | N/A | N/A | 84 | N/A | N/A | N/A |
| Initial sugar source pH | N/A | N/A | 5.7 | N/A | N/A | N/A |
| Addition Time Minutes | N/A | N/A | 8 | N/A | N/A | N/A |
| Final (Max) Product Temp F. | N/A | N/A | 118 | N/A | N/A | N/A |
| Final Product pH | N/A | N/A | 4.5 | N/A | N/A | N/A |
| Final Product Viscosity cps | N/A | N/A | 345 @ 66 | N/A | N/A | N/A |
| Observation(s) | N/A | N/A | WELL | N/A | N/A | N/A |
| Overall Observation(s) | N/F | N/F | WELL | N/F | N/F | N/F |

TABLE II-2a

| Carboxylic Acid | formic | acetic | propionic | propionic | propionic | propionic | propionic |
|---|---|---|---|---|---|---|---|
| Acid-Sugar Test Concentrations Mixing Sequence 2 | 20%-HI | 20%-HI | 5%-LO | 5%-HI | 20%-HI | 25%-LO | 25%-HI |
| a. Add acid to "added water" | | | | | | | |
| Acid conc g/100 g $H_2O$ | 116 | 110 | 610 | 56 | 109 | 207 | 191 |
| Acid conc/solubility | 0.1 | 0.1 | 0.6 | 0.1 | 0.1 | 0.2 | 0.2 |
| Initial added water temp F. | 76 | 76 | 70 | 71 | 71 | 70 | 70 |
| Final acid/added water temp F. | 80 | 82 | 65 | 69 | 65 | 69 | 65 |
| Final acid/added water pH | 1.2 | 1.5 | 1.6 | 2.0 | 1.7 | 1.3 | 1.8 |
| Observation(s) | VIOLENT HEAT 160 | SEVERE | OK | OK | OK | OK | OK |
| b. Add base to acid/added water | NO | YES | YES | YES | YES | YES | YES |
| NaOH conc g/100 g $H_2O$ | 33 | 27 | 62 | 13 | 23 | 36 | 34 |
| CaOH$_2$ conc g/100 g $H_2O$ | 31 | 25 | 69 | 15 | 21 | 40 | 38 |
| Initial NaOH/CaOH$_2$ temp F. | 74 | 81 | 86 | 75 | 81 | 86 | 72 |
| Initial NaOH/CaOH$_2$ pH | 13.7 | 13.6 | 13.1 | 13.9 | 13.8 | 13.3 | 13.9 |
| Initial CaOH$_2$ conc g/100 g $H_2O$ | 92.5 | 92.5 | 111 | 111 | 92.6 | 111 | 111 |
| Initial NaOH/CaOH$_2$ Observ. | N/A | PASTE | PASTE | PASTE | PASTE | PASTE | PASTE |
| NaAcid Salt conc g/100 g $H_2O$ | 57 | 55 | 149 | 32 | 55 | 86 | 82 |
| NaAcid Salt conc/solubility | 12.15 | 14.98 | 105.97 | 22.55 | 17.79 | 19.60 | 18.50 |
| CaAcid Salt conc g/100 g $H_2O$ | 54 | 53 | 145 | 31 | 53 | 84 | 79 |

TABLE II-2a-continued

| Carboxylic Acid | | formic | acetic | propionic | propionic | propionic | propionic | propionic |
|---|---|---|---|---|---|---|---|---|
| | CaAcid Salt conc/solubility | 20.97 | 17.88 | 17.08 | 5.36 | 16.60 | 21.14 | 27.82 |
| | Final salt/added water temp F. | N/A | 184 | 165 | 127 | 183 | 192 | 198 |
| | Observation(s) | N/A | SEVERE FOAM | THICK SEVERE | creamy | creamy | CAKE | THICK |
| c. | Add sugar source | NO | NO | NO | YES | YES | NO | NO |
| | Initial sugar source temp F. | N/A | N/A | N/A | 71 | 68 | N/A | N/A |
| | Initial sugar source pH | N/A | N/A | N/A | 5.7 | 5.7 | N/A | N/A |
| | Addition Time Minutes | N/A | N/A | N/A | 6 | 3 | N/A | N/A |
| | Final (Max) Product Temp F. | N/A | N/A | N/A | 81 | 133 | N/A | N/A |
| | Final Product pH | N/A | N/A | N/A | 6.0 | 6.0 | N/A | N/A |
| | Final Product Vis. cps @ 66 F. | N/A | N/A | N/A | 4230 @ 68 | 400 @ 72 | N/A | N/A |
| | Observation(s) | N/A | N/A | N/A | WELL | WELL | N/A | N/A |
| Overall Observation(s) | | N/F | N/F | N/F | POOR | POOR | N/F | N/F |

TABLE II-2b

| Carboxylic Acid | | succinic | maleic | fumaric | fumaric | benzoic | Hyd. Veg. Oil |
|---|---|---|---|---|---|---|---|
| Acid-Sugar Test Concentrations Mixing Sequence 2 | | 20%-HI | 20%-HI | 5%-HI | 20%Hi | 20%-HI | 29%-HI |
| a. | Add base to "added water" | | | | | | |
| | Acid conc g/100 g $H_2O$ | 79 | 79 | 23 | 111 | 104 | 106 |
| | Acid conc/solubility | 13.1 | 1.0 | 32.3 | 158.7 | 306.2 | 10551.3 |
| | Initial added water temp F. | 68 | 78 | 78 | 71 | 71 | 71 |
| | Final acid/added water temp F. | 63 | 53 | 77 | 70 | N/M | N/M |
| | Final acid/added water pH | 2.2 | 0.6 | 2.2 | 2.2 | N/M | N/M |
| | Observation(s) | THICK Separates | Separates | Separates | Separates | THICK CAKE | TWO PHASE |
| b. | Add base to acid/added water | YES | YES | YES | YES | NO | NO |
| | NaOH conc g/100 g $H_2O$ | 16 | 16 | 6 | 28 | 15 | 0 |
| | $CaOH_2$ conc g/100 g $H_2O$ | 17 | 18 | 6 | 26 | 13 | 12 |
| | Initial NaOH/$CaOH_2$ temp F. | 104 | 100 | 100 | 82 | N/A | N/A |
| | Initial NaOH/$CaOH_2$ pH | 13.2 | 13.2 | 13.8 | 13.2 | N/A | N/A |
| | Initial $CaOH_2$ conc g/100 g $H_2O$ | 111 | 112 | 111.1 | 92.5 | 93.0 | N/A |
| | Initial NaOH/$CaOH_2$ Observ. | PASTE | PASTE | PASTE | PASTE | N/A | N/A |
| | NaAcid Salt conc g/100 g $H_2O$ | 32 | 31 | 12 | 55 | 52 | 0 |
| | NaAcid Salt conc/solubility | 10.05 | 9.85 | 8.82 | 14.58 | 25.81 | 0.00 |
| | CaAcid Salt conc g/100 g $H_2O$ | 64 | 64 | 23 | 93 | 51 | 96 |
| | CaAcid Salt conc/solubility | 22.98 | 23.15 | 4.88 | 32.11 | 14.44 | 27.72 |
| | Final salt/added water temp F. | 133 | 154 | 114 | 165 | N/A | N/A |
| | Observation(s) | THICK | THICK FOAM | foam | THICK | N/A | N/A |
| c. | Add sugar source | NO | YES | YES | NO | NO | NO |
| | Initial sugar source temp F. | N/A | 84 | 84 | N/A | N/A | N/A |
| | Initial sugar source pH | N/A | 5.7 | 5.7 | N/A | N/A | N/A |
| | Addition Time Minutes | N/A | 5 | 4 | N/A | N/A | N/A |
| | Final (Max) Product Temp F. | N/A | 154 | 97 | N/A | N/A | N/A |
| | Final Product pH | N/A | 5.6 | 4.6 | N/A | N/A | N/A |
| | Final Product Vis. cps @ 66 F. | N/A | 1460 @ 68 | 405 @ 66 | N/A | N/A | N/A |
| | Observation(s) | N/A | THICK | slight foam | N/A | N/A | N/A |
| Overall Observation(s) | | N/F | POOR | POOR | N/F | N/F | N/F |

TABLE II-3a

| Carboxylic Acid | formic | acetic | propionic | propionic | propionic | propionic | propionic |
|---|---|---|---|---|---|---|---|
| Acid-Sugar Test Concentrations | 20%-HI | 20%-HI | 5%-LO | 5%-HI | 20%-HI | 25%-LO | 25%-HI |
| Mixing Sequence 3 | | | | | | | |
| a. Add base to added water | | | | | | | |
| NaOH conc g/100 g $H_2O$ | 35 | 73 | 62 | 13 | 23 | 36 | 34 |
| CaOH conc g/100 g $H_2O$ | 32 | 68 | 69 | 15 | 21 | 40 | 38 |
| Initial added water temp F. | 76 | 76 | 70 | 70 | 71 | 70 | 70 |
| NaOH/added water temp F. | 126 | 111 | 92 | 92 | 105 | 118 | 120 |
| Total base/added water temp F. | 126 | 115 | 96 | 93 | 106 | 106 | 122 |
| NaOH/added water pH | 13.6 | 12.7 | 13.1 | 13.2 | 13.7 | 13.6 | 13.5 |
| Total base/added water pH | 13.8 | 13.2 | 13.5 | 13.7 | 13.9 | 13.7 | 13.8 |
| Observation(s) | SLURRY | SLURRY | SLURRY | SLURRY | SLURRY | SLURRY | SLURRY |
| b. Add acid to sugar source | YES | YES | YES | YES | YES | YES | YES |
| Acid conc g/100 g $H_2O$ | 200 | 77 | 11 | 25 | 182 | 120 | 255 |
| Acid conc/solubility | 0.2 | 0.1 | 0.0 | 0.0 | 0.2 | 0.1 | 0.3 |
| Initial sugar source temp F. | 71 | 71 | 71 | 71 | 69 | 71 | 71 |
| Final acid/sugar source temp F. | 82 | 77 | 68 | 67 | 68 | 62 | 71 |
| Initial sugar source pH | 5.7 | 5.7 | 5.7 | 5.7 | 5.7 | 5.7 | 5.7 |
| Final acid/sugar source pH | 1.3 | 3.1 | 3.2 | 3.0 | 3.4 | 3.3 | 3.2 |
| Observation(s) | OK | OK | OK | OK | OK | OK | OK |
| c. Add acid/sugar source to base/added water | YES | YES | YES | YES | YES | YES | YES |
| NaAcid Salt conc g/100 g $H_2O$ | 42 | 39 | 7 | 11 | 37 | 41 | 55 |
| NaAcid Salt conc/solubility | 9.04 | 10.60 | 4.90 | 7.75 | 12.15 | 9.29 | 12.38 |
| CaAcid Salt conc g/100 g $H_2O$ | 40 | 37 | 7 | 10 | 36 | 40 | 53 |
| CaAcid Salt conc/solubility | 15.59 | 12.65 | 0.79 | 1.84 | 11.34 | 10.02 | 18.62 |
| Addition Time Minutes | slowly | 7 | 8 | slowly | 4 | 9 | 10 |
| Final (Max) Product Temp F. | 196 | 193 | 96 | 105 | 158 | 160 | >186 |
| Final Product pH | N/M | N/M | 5.2 | 6.0 | 6.2 | N/M | N/M |
| Final Product Viscosity cps | N/M | N/M | 2130 @ 68 | 4325 @ 68 | 500 @ 72 | N/M | N/M |
| Observation(s) | BURNT BOILING | BURNT HEAT 193 | WELL | WELL | FOAM | HEAT 160 | THICK HEAT 186 |
| Overall Observation(s) | N/F | N/F | WELL | WELL | POOR | POOR | N/F |

TABLE II-3b

| Carboxylic Acid | succinic | maleic | fumaric | fumaric | benzoic | Hyd. Veg. Oil |
|---|---|---|---|---|---|---|
| Acid-Sugar Test Concentrations | 20%-HI | 20%-HI | 5%-HI | 20%Hi | 20%-HI | 20%-HI |
| Mixing Sequence 3 | | | | | | |
| a. Add base to added water | | | | | | |
| NaOH conc g/100 g $H_2O$ | 16 | 16 | 6 | 28 | 15 | 0 |
| CaOH conc g/100 g $H_2O$ | 17 | 18 | 6 | 26 | 13 | 12 |
| Initial added water temp F. | 68 | 78 | 78 | 76 | 71 | 70 |
| NaOH/added water temp F. | 100 | 91 | 92 | 92 | 105 | N/A |
| Total base/added water temp F. | 104 | 104 | 88 | 88 | 105 | 73 |
| NaOH/added water pH | 11.5 | 11.5 | 11.5 | 11.5 | 13.6 | N/A |
| Total base/added water pH | 13.5 | 13.5 | 13.5 | 13.5 | 13.8 | 12.7 |
| Observation(s) | SLURRY | SLURRY | SLURRY | SLURRY | SLURRY | SLURRY |
| b. Add acid to sugar source | YES | YES | YES | YES | YES | YES |
| Acid conc g/100 g $H_2O$ | 209 | 210 | 30 | 195 | 163 | 199 |
| Acid conc/solubility | 34.8 | 2.7 | 43.3 | 279.0 | 478.4 | 19850.8 |
| Initial sugar source temp F. | 84 | 84 | 84 | 84 | 71 | 70 |
| Final acid/sugar source temp F. | 70 | 97 | 84 | 85 | 105 | 74 |
| Initial sugar source pH | 5.7 | 5.7 | 5.7 | 5.7 | 6 | 5.7 |
| Final acid/sugar source pH | 2.2 | 3.1 | 5.2 | 4.3 | 13.8 | 5.3 |
| Observation(s) | THICK | THICK | THICK | THICK | CAKE | THICK |
| c. Add acid/sugar source to base/added water | YES | YES | YES | NO | NO | YES |
| NaAcid Salt conc g/100 g $H_2O$ | 24 | 24 | 7 | 39 | 34 | 0 |
| NaAcid Salt conc/solubility | 7.63 | 7.49 | 5.18 | 10.39 | 16.68 | 0.00 |
| CaAcid Salt conc g/100 g $H_2O$ | 48 | 49 | 14 | 67 | 33 | 63 |
| CaAcid Salt conc/solubility | 17.44 | 17.60 | 2.87 | 22.88 | 9.33 | 18.10 |
| Addition Time Minutes | 15 | 8 | 7 | N/A | N/A | 10 |
| Final (Max) Product Temp F. | 129 | 158 | 1 | N/A | N/A | 85 |
| Final Product pH | 4.9 | 5.8 | 4.6 | N/A | N/A | 10.1 |
| Final Product Viscosity cps | 135 @ 66 | 3870 @ 68 | 420 @ 66 | N/A | N/A | 6050 @ 72 |
| Observation(s) | foam | foam | WELL | N/A | N/A | POOR |
| Overall Observation(s) | POOR | POOR | WELL | N/F | N/F | N/F |

TABLE II-4a

| Carboxylic Acid | formic | acetic | propionic | propionic | propionic | propionic | propionic |
|---|---|---|---|---|---|---|---|
| Acid-Sugar Test Concentrations | 20%-HI | 20%-HI | 5%-LO | 5%-HI | 20%-HI | 25%-LO | 25%-HI |
| Mixing Sequence 4 | | | | | | | |
| a. Add base to added water | | | | | | | |
| NaOH conc g/100 g $H_2O$ | 35 | 73 | 62 | 13 | 23 | 36 | 34 |
| CaOH conc g/100 g $H_2O$ | 32 | 68 | 69 | 15 | 21 | 40 | 38 |
| Initial added water temp F. | 76 | 74 | 70 | 71 | 73 | 70 | 70 |
| NaOH/added water temp F. | 126 | 111 | 92 | 91 | 105 | 118 | 121 |
| Total base/added water temp F. | 127 | 108 | 96 | 92 | 106 | 106 | 123 |
| NaOH/added water pH | 13.6 | 12.7 | 13.1 | 13.2 | 13.7 | 13.6 | 13.5 |
| Total base/added water pH | 13.8 | 13.0 | 13.3 | 13.7 | 13.9 | 13.7 | 13.8 |
| Observation(s) | SLURRY | SLURRY | SLURRY | SLURRY | SLURRY | SLURRY | SLURRY |
| b. Add acid to sugar source | YES | YES | YES | YES | YES | YES | YES |
| Acid conc g/100 g $H_2O$ | 200 | 77 | 11 | 25 | 182 | 120 | 255 |
| Acid conc/solubility | 0.2 | 0.1 | 0.0 | 0.0 | 0.2 | 0.1 | 0.3 |
| Initial sugar source temp F. | 71 | 71 | 71 | 71 | 70 | 71 | 71 |
| Final acid/sugar source temp F. | 82 | 77 | 70 | 68 | 70 | 68 | 71 |
| Initial sugar source pH | 5.7 | 5.7 | 5.7 | 5.7 | 5.7 | 5.7 | 5.7 |
| Final acid/sugar source pH | 1.3 | 3.1 | 4.2 | 3.0 | 3.4 | 3.3 | 3.2 |
| Observation(s) | fluid | fluid | fluid | fluid | fluid | fluid | fluid |
| c. Add base/added water to acid/sugar source | YES | YES | YES | YES | YES | YES | YES |
| NaAcid Salt conc g/100 g $H_2O$ | 42 | 39 | 7 | 11 | 37 | 41 | 55 |
| NaAcid Salt conc/solubility | 9.04 | 10.60 | 4.90 | 7.75 | 12.15 | 9.29 | 12.38 |
| CaAcid Salt conc g/100 g $H_2O$ | 40 | 37 | 7 | 10 | 36 | 40 | 53 |
| CaAcid Salt conc/solubility | 15.59 | 12.65 | 0.79 | 1.84 | 11.34 | 10.02 | 18.62 |
| Addition Time Minutes | 22 | 15 | 5 | | 11 | 9 | 8 |
| Final (Max) Product Temp F. | 164 | 161 | 90 | 99 | 142 | 164 | 152 |
| Final Product pH | 5.2 | 5.9 | 5.1 | 5.9 | 6.3 | | 7.2 |
| Final Product Viscosity cps | 475 @ 69 | 310 @ 68 | 645 @ 68 | 3705 @ 68 | 2975 @ 73 | 11500 @ 68 | 34600 @ 68 |
| Observation(s) | FOAM | FOAM | slight foam | WELL | foam | FOAM | THICK FOAM |
| Overall Observation(s) | POOR | POOR | WELL | WELL | WELL | POOR | POOR |

TABLE II-4b

| Carboxylic Acid | succinic | maleic | fumaric | fumaric | benzoic | Hyd. Veg. Oil |
|---|---|---|---|---|---|---|
| Acid-Sugar Test Concentrations | 20%-HI | 20%-HI | 5%-HI | 20%Hi | 20%-HI | 20%-HI |
| Mixing Sequence 4 | | | | | | |
| a. Add base to added water | | | | | | |
| NaOH conc g/100 g $H_2O$ | 16 | 16 | 6 | 28 | 15 | 0 |
| CaOH conc g/100 g $H_2O$ | 17 | 18 | 6 | 26 | 13 | 12 |
| Initial added water temp F. | 68 | 78 | 78 | 70 | 70 | 70 |
| NaOH/added water temp F. | 100 | 91 | 92 | 114 | 112 | N/A |
| Total base/added water temp F. | 104 | 104 | 88 | 115 | 114 | 73 |
| NaOH/added water pH | 11.5 | 11.5 | 11.5 | 13.5 | 11.5 | N/A |
| Total base/added water pH | 13.5 | 13.5 | 13.5 | 13.8 | 13.4 | 12.7 |
| Observation(s) | SLURRY | SLURRY | SLURRY | SLURRY | SLURRY | SLURRY |
| b. Add acid to sugar source | YES | YES | YES | YES | YES | YES |
| Acid conc g/100 g $H_2O$ | 209 | 210 | 30 | 195 | 163 | 199 |
| Acid conc/solubility | 34.8 | 2.7 | 43.3 | 279.0 | 475.4 | 19850.8 |
| Initial sugar source temp F. | 84 | 84 | 84 | 71 | 71 | 70 |
| Final acid/sugar source temp F. | 70 | 69 | 84 | 73 | N/M | 74 |
| Initial sugar source pH | 5.7 | 5.7 | 5.7 | 5.7 | 5.7 | 5.7 |
| Final acid/sugar source pH | 2.2 | 1.5 | 5.2 | 72.6 | N/M | 5.3 |
| Observation(s) | THICK | THICK | THICK | THICK | CAKE | THICK |
| c. Add base/added water to acid/sugar source | YES | YES | YES | NO | NO | YES |
| NaAcid Salt conc g/100 g $H_2O$ | 24 | 24 | 7 | 39 | 34 | 0 |
| NaAcid Salt conc/solubility | 7.63 | 7.49 | 5.18 | 10.39 | 16.68 | 0.00 |
| CaAcid Salt conc g/100 g $H_2O$ | 48 | 49 | 14 | 67 | 33 | 63 |
| CaAcid Salt conc/solubility | 17.44 | 17.60 | 2.57 | 22.55 | 9.33 | 18.10 |
| Addition Time Minutes | 5 | 8 | 6 | N/A | N/A | 10 |
| Final (Max) Product Temp F. | 118 | 144 | 111 | N/A | N/A | 83 |
| Final Product pH | 4.9 | 5.9 | 4.5 | N/A | N/A | 10.2 |
| Final Product Viscosity cps | 515 @ 66 | 4720 @ 68 | 410 @ 66 | N/A | N/A | 6250 @ 72 |
| Observation(s) | FOAM | FOAM | foam | N/A | N/A | Hard to Mix |
| Overall Observation(s) | POOR | OK | WELL | N/F | N/F | N/F |

TABLE II-5a

| Carboxylic Acid | formic | acetic | propionic | propionic | propionic | propionic | propionic |
|---|---|---|---|---|---|---|---|
| Acid-Sugar Test Concentrations | 20%-HI | 20%-HI | 5%-LO | 5%-HI | 20%-HI | 25%-LO | 25%-HI |
| Mixing Sequence 5 | | | | | | | |
| a. Add base to sugar source | | | | | | | |
|     NaOH conc g/100 g $H_2O$ | 49 | 39 | 3 | 6 | 33 | 24 | 41 |
|     CaOH conc g/100 g $H_2O$ | 46 | 36 | 3 | 7 | 30 | 27 | 45 |
|     Initial sugar source temp F. | 71 | 71 | 71 | 70 | 71 | 71 | 71 |
|     Final base/sugar source temp F. | 189 | 143 | 86 | 85 | 140 | 108 | 134 |
|     Initial sugar source pH | 5.7 | 5.7 | 5.7 | 5.7 | 5.7 | 5.7 | 5.71 |
|     Final base/sugar source pH | 10.5 | 10.4 | 6.5 | 10.0 | 12.8 | 13.4 | 12.9 |
|     Observation(s) | THICK BURNT | THICK | poor mixing | OK | THICK | poor mixing | THICK |
| b. Add acid to added water | NO | YES | YES | YES | YES | YES | YES |
|     Acid conc g/100 g $H_2O$ | 116 | 110 | 610 | 56 | 109 | 207 | 191 |
|     Acid conc/solubility | 0.1 | 0.1 | 0.6 | 0.1 | 0.1 | 0.2 | 0.2 |
|     Initial added water temp F. | N/A | 74 | 70 | 71 | 71 | 70 | 70 |
|     Final acid/added water temp F. | N/A | 81 | 65 | 69 | 67 | 69 | 66 |
|     Final acid/added water pH | N/A | 2.2 | 1.6 | 2.0 | 1.7 | 1.7 | 2.2 |
|     Observation(s) | N/A | OK | OK | OK | OK | OK | OK |
| c. Add acid/added water to base/sugar source | NO | YES | YES | YES | YES | YES | YES |
|     NaAcid Salt conc g/100 g $H_2O$ | 42 | 39 | 7 | 11 | 37 | 41 | 55 |
|     NaAcid Salt conc/solubility | 9.04 | 10.60 | 4.90 | 7.75 | 12.15 | 9.29 | 12.38 |
|     CaAcid Salt conc g/100 g $H_2O$ | 40 | 37 | 7 | 10 | 36 | 40 | 53 |
|     CaAcid Salt conc/solubility | 15.59 | 12.65 | 0.79 | 1.84 | 11.34 | 10.02 | 18.62 |
|     Addition Time Minutes | N/A | 10 | 6 | 6 | 7 | 6 | 11 |
|     Final (Max) Product Temp F. | N/A | 152 | 86 | 106 | 154 | 138 | 165 |
|     Final Product pH | N/A | 6.2 | 5.0 | 5.8 | 5.9 | 6.7 | N/M |
|     Final Product Viscosity cps | N/A | 250 @ 68 | 505 @ 68 | 4500 @ 68 | 650 @ 72 | 3850 @ 67 | N/M |
|     Observation(s) | N/A | slight foam | slight foam | WELL | HEAT FOAM | foam | HEAT 165 |
| Overall Observation(s) | N/F | POOR | WELL | WELL | POOR | OK | POOR |

TABLE II-5b

| Carboxylic Acid | succinic | maleic | fumaric | fumaric | benzoic | Hyd. Veg. Oil |
|---|---|---|---|---|---|---|
| Acid-Sugar Test Concentrations | 20%-HI | 20%-HI | 5%-HI | 20%Hi | 20%-HI | 20%-HI |
| Mixing Sequence 5 | | | | | | |
| a. Add base to sugar source | | | | | | |
|     NaOH conc g/100 g $H_2O$ | 33 | 33 | 8 | 41 | 21 | 0 |
|     CaOH conc g/100 g $H_2O$ | 36 | 37 | 8 | 38 | 20 | 22 |
|     Initial sugar source temp F. | 84 | 84 | 84 | 70 | 70 | 70 |
|     Final base/sugar source temp F. | 134 | 134 | 93 | 162 | 138 | 138 |
|     Initial sugar source pH | 5.7 | 5.7 | 5.7 | 5.7 | 5.7 | 5.7 |
|     Final base/sugar source pH | 13.1 | 13.1 | 9.2 | 13.5 | 12.9 | 12.9 |
|     Observation(s) | THICK | THICK burnt smell | THICK | THICK burnt smell | THICK | THICK |
| b. Add acid to added water | YES | YES | YES | YES | YES | YES |
|     Acid conc g/100 g $H_2O$ | 79 | 79 | 23 | 111 | 104 | 106 |
|     Acid conc/solubility | 13.1 | 1.0 | 32.3 | 158.7 | 306.2 | 10551.3 |
|     Initial added water temp F. | 68 | 68 | 78 | 71 | 71 | 71 |
|     Final acid/added water temp F. | 63 | 53 | 76 | 71 | N/M | N/M |
|     Final acid/added water pH | 2.2 | 0.6 | 2.2 | 2.3 | N/M | N/M |
|     Observation(s) | Separates | Separates | Separates | Separates | CAKE | Separates |
| c. Add acid/added water to base/sugar source | YES | YES | YES | NO | NO | NO |
|     NaAcid Salt conc g/100 g $H_2O$ | 24 | 24 | 7 | 39 | 34 | 0 |
|     NaAcid Salt conc/solubility | 7.63 | 7.49 | 5.18 | 10.39 | 16.68 | 0.00 |
|     CaAcid Salt conc g/100 g $H_2O$ | 48 | 49 | 14 | 67 | 33 | 63 |
|     CaAcid Salt conc/solubility | 17.44 | 17.60 | 2.87 | 22.88 | 9.33 | 18.10 |
|     Addition Time Minutes | 7 | 10 | 6 | N/A | N/A | N/A |
|     Final (Max) Product Temp F. | 127 | 145 | 114 | N/A | N/A | N/A |
|     Final Product pH | 4.8 | 5.5 | 4.6 | N/A | N/A | N/A |
|     Final Product Viscosity cps | 800 @ 66 | 1080 @ 68 | 450 @ 66 | N/A | N/A | N/A |
|     Observation(s) | foam | FOAM | WELL | N/A | N/A | N/A |
| Overall Observation(s) | WELL | OK | WELL | N/F | N/F | N/F |

TABLE II-6a

| Carboxylic Acid | formic | acetic | propionic | propionic | propionic | propionic | propionic |
|---|---|---|---|---|---|---|---|
| Acid-Sugar Test Concentrations | 20%-HI | 20%-HI | 5%-LO | 5%-HI | 20%-HI | 25%-LO | 25%-HI |
| Mixing Sequence 6 | | | | | | | |
| a. Add base to sugar source | | | | | | | |
| NaOH conc g/100 g $H_2O$ | 49 | 39 | 3 | 6 | 33 | 24 | 41 |
| CaOH conc g/100 g $H_2O$ | 46 | 36 | 3 | 7 | 30 | 27 | 45 |
| Initial sugar source temp F. | 71 | 71 | 71 | 71 | 70 | 71 | 71 |
| Final base/sugar source temp F. | 189 | 143 | 86 | 85 | 145 | 108 | 134 |
| Initial sugar source pH | 5.7 | 5.7 | 5.7 | 5.7 | 5.7 | 5.7 | 5.7 |
| Final base/sugar source pH | 5.7 | 10.4 | 6.5 | 10.0 | 12.8 | 13.4 | 12.9 |
| Observation(s) | THICK BURNT | THICK | poor mixing | THICK | THICK | poor mixing | THICK |
| b. Add acid to added water | NO | YES | YES | YES | YES | YES | YES |
| Acid conc g/100 g $H_2O$ | 116 | 110 | 610 | 56 | 109 | 207 | 191 |
| Acid conc/solubility | 0.1 | 0.1 | 0.6 | 0.1 | 0.1 | 0.2 | 0.2 |
| Initial added water temp F. | N/A | 74 | 70 | 71 | 71 | 70 | 70 |
| Final acid/added water temp F. | N/A | 81 | 65 | 69 | 65 | 69 | 66 |
| Final acid/added water pH | N/A | 2.2 | 1.6 | 2.0 | 1.7 | 1.7 | 2.2 |
| Observation(s) | OK | OK | OK | OK | OK | OK | OK |
| c. Add base/sugar source to acid/added water | NO | YES | YES | YES | YES | YES | YES |
| NaAcid Salt conc g/100 g $H_2O$ | 42 | 39 | 7 | 11 | 37 | 41 | 55 |
| NaAcid Salt conc/solubility | 9.04 | 10.60 | 4.90 | 7.75 | 12.15 | 9.29 | 12.38 |
| CaAcid Salt conc g/100 g $H_2O$ | 40 | 37 | 7 | 10 | 36 | 40 | 53 |
| CaAcid Salt conc/solubility | 15.59 | 12.65 | 0.79 | 1.84 | 11.34 | 10.02 | 18.62 |
| Addition Time Minutes | N/A | 12 | 5 | 6 | 8 | 11 | 14 |
| Final (Max) Product Temp F. | N/A | 139 | 87 | 96 | 145 | 160 | 169 |
| Final Product pH | N/A | 6.1 | 5.1 | 5.7 | 5.7 | 6.2 | N/M |
| Final Product Viscosity cps | N/A | 270 @ 71 | 480 @ 68 | 4190 @ 68 | 600 @ 72 | 750 @ 68 | N/M |
| Observation(s) | N/A | slight foam | slight foam | WELL | foam | FOAM | FOAM THICK HEAT |
| Overall Observation(s) | N/F | OK | OK | OK | OK | POOR | N/F |

TABLE II-6b

| Carboxylic Acid | succinic | maleic | fumaric | fumaric | benzoic | Hyd. Veg. Oil |
|---|---|---|---|---|---|---|
| Acid-Sugar Test Concentrations | 20%-HI | 20%-HI | 5%-HI | 20%Hi | 20%-HI | 20%-HI |
| Mixing Sequence 6 | | | | | | |
| a. Add base to sugar source | | | | | | |
| NaOH conc g/100 g $H_2O$ | 33 | 33 | 8 | 41 | 21 | 0 |
| CaOH conc g/100 g $H_2O$ | 36 | 37 | 8 | 38 | 20 | 22 |
| Initial sugar source temp F. | 84 | 84 | 84 | 70 | 70 | 70 |
| Final base/sugar source temp F. | 134 | 134 | 93 | 162 | 134 | 134 |
| Initial sugar source pH | 5.7 | 5.7 | 5.7 | 5.7 | 5.7 | 5.7 |
| Final base/sugar source pH | 13.1 | 13.1 | 9.2 | 13.1 | 13.1 | 13.1 |
| Observation(s) | THICK | THICK | THICK | THICK burnt smell | THICK | THICK |
| b. Add acid to added water | YES | YES | YES | YES | YES | YES |
| Acid conc g/100 g $H_2O$ | 79 | 79 | 23 | 104 | 106 | |
| Acid conc/solubility | 13.1 | 1.0 | 32.3 | 158.7 | 306.2 | 10551.3 |
| Initial added water temp F. | 68 | 68 | 78 | 71 | 71 | N/A |
| Final acid/added water temp F. | 63 | 53 | 76 | 71 | N/M | N/A |
| Final acid/added water pH | 2.2 | 0.6 | 2.2 | 2.3 | N/M | N/A |
| Observation(s) | Separates | Separates | Separates | Separates | CAKE | Separates |
| c. Add base/sugar source to acid/added water | YES | YES | YES | NO | NO | NO |
| NaAcid Salt conc g/100 g $H_2O$ | 24 | 24 | 7 | 39 | 34 | 0 |
| NaAcid Salt conc/solubility | 7.63 | 7.49 | 5.18 | 10.39 | 16.68 | 0.00 |
| CaAcid Salt conc g/100 g $H_2O$ | 48 | 49 | 14 | 67 | 33 | 63 |
| CaAcid Salt conc/solubility | 17.44 | 17.60 | 2.87 | 22.88 | 9.33 | 18.10 |
| Addition Time Minutes | 10 | 12 | 5 | N/A | N/A | N/A |
| Final (Max) Product Temp F. | 119 | 138 | 111 | N/A | N/A | N/A |
| Final Product pH | 4.8 | 5.1 | 4.6 | N/A | N/A | N/A |
| Final Product Viscosity cps | 1900 @ 66 | 900 @ 68 | 440 @ 66 | N/A | N/A | N/A |
| Observation(s) | WELL | FOAM | WELL | N/A | N/A | N/A |
| Overall Observation(s) | WELL | POOR | WELL | N/F | N/F | N/F |

THEORETICAL DISCUSSION

Without being limited by the following theoretical discussion, it is presently believed that the experimental results testing the parameters of the invention can be theoretically explained as follows.

In general, it is believed that the parameters of the present invention can be explained with reference to three major and interrelated factors: first, the solubility characteristics of carboxylic acid and the salts thereof; second, the ability of aqueous sugar-bearing sources to suspend super concentrations of carboxylic acid and/or the salts thereof in a liquid matrix; and third, the heat of carboxylic acid neutralization. To realize the benefits of the inventive process, the mixing of the carboxylic acid and the inorganic base must be at least partially performed in the presence of the aqueous sugar-bearing source, and preferably entirely in the presence of the aqueous sugar-bearing source.

Characteristics of Carboxylic Acid and Salts Thereof

Table III illustrates some of the fundamental characteristics of representative carboxylic acids and representative salts thereof, particularly carboxylic acids having in the range of 1–8 carbon atoms, including the melting point, the water solubility in grams/100 grams of water at standard temperature and pressure ("STP"), the acidity constant ("Ka") of the pure compound, and, in the case of dicarboxylic acids, the second acidity constants ("Ka-2"), and also the water solubility of sodium and calcium salts thereof. Of course, there are many other carboxylic acids that can be considered for use according to the invention described herein.

It is important to note that the solubility of certain carboxylic acids increases dramatically with increasing temperature of the water. Such acids tend to be more useful in processes for which the heats of solution and/or neutralization increase the temperature sufficiently to help initially dissolve higher concentrations of carboxylic acid in an aqueous mixture. Process heating can be employed to increase the temperature of the starting materials and/or the mixtures formed during the process, subject to maintaining the mixtures within an acceptable temperature range during the mixing steps of the process. Of course, adding process heating would be expected to add to the processing costs, thereby detracting from some of the benefits of the process. According to the presently most preferred embodiments of the invention, no added process heating is used or necessary. Nevertheless, it is anticipated that commercially viable processes using added heating of the starting materials and/or mixtures can be achieved within the parameters of the present invention.

It is also important to note the water solubility of the salts of the carboxylic acids, shown for sodium and calcium above. Except for the $C_1$–$C_3$ carboxylic acids salts, for which the solubilities of the salts are all very high, the solubilities of the rest of the carboxylic acids salts tend to be inverse of the solubility of the carboxylic acid. In other words, if the solubility of the carboxylic acid is low, the solubility of the salt of that particular acid tends to be much higher than that of the carboxylic acid, and vice-versa. This characteristic of carboxylic acids is particularly dramatic with the sodium salts and to a lesser extent with the calcium and ammonium salts thereof The tendency of inverse solubilities between the acid and the conjugate salt presents one of the particular challenges of working with carboxylic acids and making their salts, in that, except for the $C_1$–$C_3$ carboxylic acids.

TABLE III

| Carboxylic Acid | # C | M.P. (° C.) | Acid Solubility in Water (g/100 g) @ STP | Acidity Ka × 10–5 @ STP | Acidity Ka-2 × 10–5 @ STP | Na Acid Salt Solubility @ STP | Ca Acid Salt Solubility @ STP |
|---|---|---|---|---|---|---|---|
| "alkane" carboxylic acids | | | | | | | |
| formic acid | 1 | 8 | miscible | 17.7 | N/A | 97 | 16 |
| acetic acid | 2 | 17 | miscible | 1.75 | N/A | 119 | 37 |
| glycolic acid | 2 | 78 | miscible | 14.8 | N/A | | |
| propionic acid | 3 | −22 | miscible | 1.34 | N/A | mis. | 49 |
| lactic acid | 3 | 18 | miscible | 13.7 | N/A | very | 3.1 |
| n-butyric acid | 4 | −4 | miscible | 1.52 | N/A | sol. | sol. |
| n-veleric acid | 5 | −34 | 3.7 | 1.51 | N/A | sol. | 8.3 |
| n-caproic acid | 6 | −3 | 1.0 | 1.31 | N/A | | |
| hexahydrobenxoic acid | 7 | 31 | 0.2 | 1.26 | N/A | | |
| dicarboxylic acids | | | | | | | |
| oxalic acid | 2 | 189 | 9 | 5400 | 5.2 | 3.7 | 0.0 |
| malonic acid | 3 | 136 | 74 | 149 | 0.20 | | 0.4 |
| succinic acid | 4 | 185 | 6 | 6.9 | 0.25 | 21 | 0.2 |
| glutaric acid | 5 | 99 | 64 | 4.5 | 0.38 | | |
| adipic acid | 6 | 151 | 2 | 3.7 | 0.39 | | |
| maleic acid | 4 | 130 | 79 | 1420 | 0.087 | | 2.9 |
| fumaric (trans) | 4 | 302 | 0.7 | 93 | 3.6 | | 2.1 |
| tricarboxylic acids | | | | | | | |
| citric acid | 6 | 153 | very | 75 | 1.7 | 72 | 0.85 |
| aromatic carboxylic acids | | | | | | | |
| benzoic acid | 7 | 122 | 0.34 | 6.3 | N/A | 66 | 2.7 |
| phenylacetic acid | 8 | 77 | 1.66 | 4.9 | N/A | | |
| phthalic acid | 8 | 231 | 0.70 | 110 | 0.4 | | |
| isophthalic acid | 8 | 348 | 0.01 | 24 | 2.5 | | |

Ability of Aqueous Sugar-bearing Sources to Suspend Super Concentrations

If the carboxylic acid has very low or only slight solubility in water, it can be difficult so dissolve the acid in water, causing the mixture to thicken and quickly separate on standing. The carboxylic acid can even absorb all the available water to the point that the mixture becomes a clumped or caked mass that cannot be pumped in conventional animal feed processing equipment. In such an extreme case, even if the solubility of the conjugate salts is much higher, the lack of sufficient free water prevents the desired acid-base reaction and the process is not feasible.

For example, even though an amount of carboxylic acid used is many times the solubility of the carboxylic acid, such that the acid and water of the mixture quickly separate if not continuously mixed or otherwise agitated, the mixture can still be used in a mixing process. Based on the following experiments, it appears that for a mixture of carboxylic acid and pure water, the workable upper limit on the concentration of the carboxylic acid relative to water is somewhere between about 150 to 300 times the solubility of the carboxylic acid before such a mixture becomes very so thick or cakes to the point of being completely not feasible. See Table II-2B, Mixing Sequence 2, comparing the mixing sequence steps for the test formulation "fumaric 20%-Hi" and "benzoic 20%-HI".

On the other side of this solubility characteristic, if the carboxylic acid is moderately or highly soluble in water, when reacted with the base, the resulting carboxylic acid salt tends to be insoluble and the salt tends to precipitate out of the mixture. This can cause the resulting mixture to thicken. The carboxylic acid salt can even absorb substantially all the available water to the point that the mixture becomes a clumped or caked mass that cannot be pumped in conventional animal feed processing equipment. At this point, the process becomes not feasible.

For example, even though an amount of the carboxylic acid salt is produced that is many times the solubility of the carboxylic acid salt, such that the mixture tends to become quite thick and viscous, the mixture can still be used in a mixing process. Based on the following experiments, it appears that for a mixture of sodium and calcium carboxylic acid salts and pure water, the workable upper limit on the concentration of the carboxylic acid salt relative to water is somewhere between about 30 to 40 times the solubility of the carboxylic acid salts before such a mixture becomes so thick or cakes to the point of being completely not feasible. See Table II–2a and II–2b, Mixing Sequence 2, comparing the mixing sequence for the test formulations for propionic acid, maleic acid, fumaric acid, and succinic acid. At this point, it has not yet been experimentally demonstrated whether the relative concentration of the sodium or calcium carboxylic acid salt to the available water is more critical, but it is believed that the relative concentration of calcium carboxylic acid salt, which tends to be less soluble than the corresponding sodium carboxylic acid salt, is probably more critical than the relative concentration of the corresponding sodium carboxylic acid salt to the available water.

Although these relative amounts of the carboxylic acid and conjugate salts to the water are many times higher than their solubilities, these relative amounts are still much less than desired for achieving the desired concentration of the carboxylic acid salts in the desired animal feed ingredient. The inverse solubility characteristics would appear insurmountable to achieve the desired concentrations relative to water before adding to the aqueous-bearing sugar source.

Without some other solution this solubility problem, it would be expected that the carboxylic acid salt would have to be made with much more water or in another solvent, and then dried of the water or other solvent before use in making the feed ingredient compositions with the desired high concentration of carboxylic acid salt.

According to one aspect of the invention, it has been observed that the types of aqueous sugar-bearing sources described above have water "naturally" occurring therein. This water can be used to help with the desired acid-base neutralization reaction. According to a further aspect of the invention it has also been observed that these types of aqueous sugar-bearing sources also tend to have a complex composition, providing a liquid have a aqueous matrix of suspended materials, including "naturally" occurring sugars, starches, proteins, and other dry matter. This complex of ingredients that allow the sugar-bearing sources to suspend many times the amount of carboxylic acid and/or carboxylic acid salts than would otherwise be dissolved in pure water or suspended in an agitated mixture with pure water while having the mixture remain in a liquid state.

According to the presently most preferred embodiment of the invention, the carboxylic acid is preferably selected from the group consisting: formic acid, acetic acid, propionic acid, and any combination of the foregoing. These acids are demonstrated to work well, even at high concentrations, which is attributed to the high solubility of both the acid and the conjugate inorganic base salts thereof. Moderate to slightly soluble carboxylic acids, such as oxalic acid, maleic acid, fumaric acid, and succinic acid, and possibly even very slightly soluble benzoic acid, also work at somewhat lower but still acceptably high concentrations, and are expected to be suitable if the process conditions and mixing sequences are more carefully controlled.

The $C_1$–C8 carboxylic acids are expected to have certain advantages and uses that are substantially different than the longer chain carboxylic acids, such as the $C_{14}$–$C_{22}$ fatty acids, which are completely insoluble in water, are much less acidic, and for which it may be less important to have neutralized for handling or further use in animal feed processing equipment. For example, the experiments presented in Tables II–3a, II–3b, II–4a, and II–4b illustrate that the fatty acids are so insoluble in water and suspended in the aqueous sugar-bearing source, it hardly affects the pH of the resulting acid/sugar source pre-mixture, and when mixed with the inorganic base, the complete insolubility of the fatty acid in water does not allow the fatty acid does not react with the base, causing the pH of the resulting mixture to be highly basic.

Heat of Carboxylic Acid Neutralization

According to a further aspect of the invention, the carboxylic acid equivalent concentration that is expected to be neutralized with the inorganic base is preferably at most about 10 acid equivalents, and more preferably less than about 8.0 acid equivalents, per 1,000 grams of the total water content derived from all the starting materials used in the process. These parameters are illustrated by the demonstrated tendency of high concentrations of the acid neutralization to overheat the resulting mixture, risking or causing caramelization of the sugars in the matrix. Compare the formulations of Tables Ia and Ib to the experimental results of the various mixing sequences presented in Tables II4a through II6b. Thus, the heat of acid-base neutralization can be substantially absorbed by the available water content during the mixing process without causing the mixture to heat excessively and risk caramelizing the sugars in the mixture. This is particularly important for the strongest of the carboxylic acids.

Mixing Sequences to Help Control Viscosity and Heats During Process

As can be gleaned from the experimental results presented in Tables II–3a through II–6b, certain mixing sequences are better than others for mixing such high concentrations of starting materials to achieve the desired resulting mixing.

For example, it can be observed from Mixing Sequences 5 and 6 (presented in Tables II–5a through II–6b) that mixing such a high concentration of base with a concentrated sugar-bearing source tends to cause the base/sugar source pre-mixture to become thick and undesirably viscous, although not to the point of becoming completely unworkable. Furthermore, the concentrated base/sugar source pre-mixture tends to heat, and in certain cases even overheat the base/sugar source pre-mixture. It is believed that this thickening is caused by the reaction of the base with acids that are "naturally" occurring in commonly available aqueous sugar-bearing sources, which produce less soluble salts. Furthermore, as shown by the control experiments, dissolving the base in water is an exothermic reaction, and further, the unintended acid-base reaction produces its own heat of neutralization. For at least these theoretical reasons, mixing sequences that do not initially mix the base with the aqueous sugar-bearing source are presently more preferred. Therefore, Mixing Sequences 3 and 4 (presented in Tables II–3a through II–4b), for which the aqueous sugar-bearing source is not initially mixed with a high concentration of inorganic base, are preferred.

In addition, Mixing Sequence 4 is observed to work noticeably better than Mixing Sequence 3. It is believed that when the base/water pre-mixture is added to the acid/sugar source pre-mixture according to Mixing Sequence 4 (instead of vice-versa), that the concentration of un-reacted acid remains in excess until most or all the base/water pre-mixture has been added. Thus, the previously discussed undesirable consequences of having an excess concentration of base with the aqueous sugar-bearing source can be avoided. Therefore, Mixing Sequence 4 (presented in Tables II–4a and II–4b), is the presently most preferred mixing sequence.

According to the foregoing experimental results, the process according to the invention preferably includes the following steps:

(a) separately mixing the carboxylic acid and the aqueous sugar-bearing source to obtain an acid/sugar source pre-mixture; and then (b) mixing the inorganic base with the acid/sugar source pre-mixture.

More preferably, the step of mixing the inorganic base with the acid/sugar source pre-mixture further comprises: admixing the inorganic base to the acid/sugar source pre-mixture.

In cases where additional water is added to the mixture to help obtain a resulting mixture having the desired characteristics, the mixing step process preferably comprises:

(a) mixing the inorganic base with the additional water to obtain a liquid base/water pre-mixture;

(b) separately mixing the carboxylic acid with the aqueous sugar-bearing source to obtain an acid/sugar source pre-mixture; and then (c) mixing the acid/sugar source pre-mixture and the base/water pre-mixture.

More preferably, the step of mixing the acid/sugar source pre-mixture and the base/water pre-mixture further comprises: admixing the base/water pre-mixture to the acid/sugar source pre-mixture.

ANIMAL FEED "TEST PRODUCT NO. 482–4301"

The following example illustrates one of the ways the invention can be used for the formulation of an animal feed product having relatively high concentration of added sugar and neutralized carboxylic acid.

1. Mixing starting materials according to the invention to make a liquid sugar-bearing animal feed ingredient with propionic acid and calcium hydroxide to form calcium propionate therein, referred to as "Test Product No. 482–4301," having the following weight percent composition based on starting materials:

| (a) | Propionic Acid | 7.700 wt % | (Carboxylic acid) |
|---|---|---|---|
| (b) | 85.4 Cane mixed | 75.184 wt % | (Aqueous sugar-bearing |
|  | Added Water | 8.296 wt % | source) |
| (c) | Calcium Hydroxide | 4.170 wt % | (Inorganic base in 0.9 stoichiometric ratio to propionic acid) |
| (d) | Hydrolyzed veg oil | 2.500 wt % | (Optional additives) |
|  | Propylene Glycol | 2.000 wt % |  |
|  | Xantham Gum | 0.100 wt % |  |
|  | Fla Car-Mol Flavorin | 0.050 wt % |  |

2. Mixing the sugar-bearing animal feed ingredient "Product No. 482–4301" with beet pulp, in a second formulation step to obtain "Test Product No. ENERGIZE" having the following calculated composition based on starting materials:

| Propionic Acid | 5.133 wt % |
|---|---|
| 85.4 Canemixed | 50.123 |
| Water | 5.531 |
| Calcium Hydroxide | 2.780 |
| Hydrolyzed veg oil | 1.667 |
| Propylene Glycol | 1.333 |
| Xantham Gum | 0.067 |
| Fla Car-Mol Flavorin | 0.033 |
| Beet Pulp | 33.333 |

3. After drying excess water introduced by the beet pulp, the "Test Product No. ENERGIZE" to 95% dry matter, it has the following calculated composition based on starting materials:

| Propionic Acid | 6.225 wt % |
|---|---|
| 85.4 Canemixed | 60.789 |
| Water | 5.000 |
| Calcium Hydroxide | 3.372 |
| Hydrolyzed veg oil | 2.022 |
| Propylene Glycol | 1.617 |
| Xantham Gum | 0.081 |
| Fla Car-Mol Flavorin | 0.040 |
| Beet Pulp (D.M.) | 20.854 |

4. Finally, adding propylene glycol and dry clay to the 95% dried "Test Product No. ENERGIZE" results in an animal feed supplement referred to as "Test Product No. ENER2," having the following calculated composition based on starting materials:

| | |
|---|---|
| Propionic Acid | 5.727 wt % |
| 85.4 Canemixed | 55.926 |
| Water | 4.600 |
| Calcium Hydroxide | 3.102 |
| Hydrolyzed veg oil | 1.860 |
| Propylene Glycol | 7.488 |
| Xantham Gum | 0.075 |
| Fla Car-Mol Flavorin | 0.037 |
| Beet Pulp (D.M.) | 19.186 |
| Dry Clay | 2.000 |

Thus, the final "ENER2" composition for use as an animal feed supplement contains at least about 6 weight percent propionic acid, which is carried in the animal feed supplement as a buffered propionic acid salt, in addition to other valued nutritive components. This feed supplement can be added to a bulk feed mixture (e.g., maize-soya) at the rate of about 10 weight percent, for example, ultimately resulting in a buffered propionic acid concentration of about 0.08 acid equivalents per 1,000 g of the resulting animal feed.

Conclusion

The liquid animal feed ingredients produced by the inventive processes described herein can be used in numerous types of animal feed supplements and of animal feeds.

The description of the specific examples herein does not necessarily point out what an infringement would be, but are to provide at least one explanation of how to make and use the invention. Numerous modifications and variations to the invention and to the preferred embodiments can be made without departing from the scope and spirit of the invention. Thus, the limits of the invention and the bounds of the patent protection are measured by and defined by the following claims.

Having described the invention, what is claimed is:

1. A process of producing a liquid animal feed ingredient comprising sugar and carboxylic acid salt, the process comprising the step of mixing:
   (a) an aqueous sugar-bearing source characterized by having:
      (i) a total monosaccharide and disaccharide sugar content of at least 5.0 weight percent based on the amount of the aqueous sugar-bearing source; and
      (ii) a water content of at least 10 weight percent; and
   (b) carboxylic acid having in the range of 1–8 carbon atoms; and
   (c) inorganic base;
   wherein the step of mixing the carboxylic acid and the inorganic base is at least partially performed in the presence of the aqueous sugar-bearing source, and wherein the proportions of the aqueous sugar-bearing source, carboxylic acid, and inorganic base are selected such that the resulting mixture has the following characteristics:
      (i) the total monosaccharide and disaccharide sugar concentration is at least 3.0 weight percent of the resulting mixture;
      (ii) the carboxylic acid equivalent concentration is at least 0.5 equivalent per 1,000 g of the resulting mixture;
      (iii) the pH of the resulting mixture is at least 3.5; and
      (iv) the viscosity of the resulting mixture is less than about 40,000 centipoise when measured at about room temperature and at about standard atmospheric pressure.

2. A process of producing a liquid animal feed ingredient comprising sugar and carboxylic acid salt according to claim 1, wherein the step of mixing the carboxylic acid and the inorganic base is performed entirely in the presence of the aqueous sugar-bearing source.

3. A process of producing a liquid animal feed ingredient comprising sugar and carboxylic acid salt according to claims 1 or 2, wherein the step of mixing further comprises:
   (a) separately mixing the carboxylic acid and the aqueous sugar-bearing source to obtain an acid/sugar source pre-mixture; and then
   (b) mixing the inorganic base and the acid/sugar source pre-mixture.

4. A process of producing a liquid animal feed ingredient comprising sugar and carboxylic acid salt according to claim 3 wherein the step of mixing the inorganic base and the acid/sugar source pre-mixture further comprises:
   admixing the inorganic base to the acid/sugar source pre-mixture.

5. A process of producing a liquid animal feed ingredient comprising sugar and carboxylic acid salt according to claims 1 or 2, further comprising the step of admixing additional water to help obtain the resulting mixture.

6. A process of producing a liquid animal feed ingredient comprising sugar and carboxylic acid salt according to claim 5, wherein the step of mixing further comprises:
   (a) mixing the inorganic base with the additional water to obtain a liquid base/water pre-mixture;
   (b) separately mixing the carboxylic acid with the aqueous sugar-bearing source to obtain an acid/sugar source pre-mixture; and then
   (c) mixing the acid/sugar source pre-mixture and the base/water pre-mixture.

7. A process of producing a liquid animal feed ingredient comprising sugar and carboxylic acid salt according to claim 6, wherein the step of mixing the acid/sugar source pre-mixture and the base/water pre-mixture further comprises:
   admixing the base/water pre-mixture to the acid/sugar source pre-mixture.

8. A process of producing a liquid animal feed ingredient comprising sugar and carboxylic acid salt according to claims 1 or 2, wherein the aqueous sugar-bearing source has an invert sugar content of at least 10 weight percent based on the amount of the aqueous sugar-bearing source.

9. A process of producing a liquid animal feed ingredient comprising sugar and carboxylic acid salt according to claim 8, wherein the proportions are further selected such that the invert sugar content of the resulting mixture is at least 5.0 weight percent.

10. A process of producing a liquid animal feed ingredient comprising sugar and carboxylic acid salt according to claims 1 or 2, wherein the aqueous sugar-bearing source is selected from the group consisting of: one or more food processing by-products, one or more fermentation by-products, industrial by-products, and any combination of the foregoing.

11. A process of producing a liquid animal feed ingredient comprising sugar and carboxylic acid salt according to claim 1, wherein the carboxylic acid is selected from the group consisting of: formic acid, acetic acid, propionic acid, and any combination of the foregoing.

12. A process of producing a liquid animal feed ingredient comprising sugar and carboxylic acid salt according to claim 1, wherein the inorganic base is s elected from the group consisting of: one or more Group I metal hydroxides, one or more of the Group II metal hydroxides, one or more of the Group I metal oxides, ammonium hydroxide, and any combination of the foregoing.

13. A process of producing a liquid animal feed ingredient comprising sugar and carboxylic acid salt according to claim 1, wherein the inorganic base is selected from the group consisting of: sodium hydroxide, calcium hydroxide, calcium oxide, ammonium hydroxide, and any combination of the foregoing.

14. A process of producing a liquid animal feed ingredient comprising sugar and carboxylic acid salt according to claims 1 or 2, wherein the inorganic base is in a stoichiometric proportion of up to about 1.1 relative to the carboxylic acid.

15. A process of producing a liquid animal feed ingredient comprising sugar and carboxylic acid salt according to claims 1 or 2, wherein the inorganic base is used in a limited amount such that the resulting animal feed ingredient has a pH of at most 7.0.

16. A process of producing a liquid animal feed ingredient comprising sugar and carboxylic acid salt according to claims 1 or 2, wherein the aqueous sugar-bearing source is at an initial temperature of less than 100° F. (38° C.).

17. A process of producing a liquid animal feed ingredient comprising sugar and carboxylic acid salt according to claim 16, wherein the resulting mixture has a sufficient heat capacity such that the heat of neutralization of the carboxylic acid and the inorganic base does not raise the temperature of the resulting feed ingredient above 165° F. (94° C.).

18. A process of producing a liquid animal feed ingredient comprising sugar and carboxylic acid salt according to claims 1 or 2, wherein the carboxylic acid equivalent concentration that is to be neutralized with the inorganic base is at most about 10 acid equivalents per 1,000 grams of the total water content of the resulting mixture.

19. A process of producing a liquid animal feed ingredient comprising sugar and carboxylic acid salt according to claim 18, wherein the carboxylic acid equivalent concentration that is to be neutralized with the inorganic base is at most about 8.0 acid equivalents per 1,000 grams of the total water content of the resulting mixture.

* * * * *

UNITED STATES PATENT AND TRADEMARK OFFICE
CERTIFICATE OF CORRECTION

PATENT NO. : 6,126,986
DATED : October 3, 2000
INVENTOR(S) : Joseph M. Harris

It is certified that error appears in the above-identified patent and that said Letters Patent is hereby corrected as shown below:

Column 1,
Line 48, after "added" insert -- to --;

Column 2,
Line 14, delete second occurrence of "of";
Line 23, after "salt" insert -- is --;
Line 51, delete "being" and insert therefor -- begin --;
Line 62, delete "be" and insert therefor -- by --;

Column 3,
Line 47, delete "it" and insert therefor -- is --;

Column 5,
Line 38, delete "chin" and insert therefor -- chain --;
Line 47, delete "may be and";

Column 8,
Line 4, after "boiling" insert -- point --;
Line 13, delete second occurrence of "in";
Line 24, after "materials" insert -- to --;

Column 9,
Line 2, delete "in";
Line 40, delete "the";

Column 10,
Line 39, after "ingredient" insert -- is --;

Column 12,
Line 11, delete "Forms" and insert therefor -- "Form." --;

TABLE 1a,
Line 33, under "Propionic" column, delete "3.50" and insert therefor -- 3.80 --;

Column 16,
Line 13, after "divided" insert -- by --;
Line 29, delete "step," and insert therefor -- step. --;

UNITED STATES PATENT AND TRADEMARK OFFICE
CERTIFICATE OF CORRECTION

PATENT NO. : 6,126,986
DATED : October 3, 2000
INVENTOR(S) : Joseph M. Harris

It is certified that error appears in the above-identified patent and that said Letters Patent is hereby corrected as shown below:

TABLE II-2b,
At "a.", delete "base" and insert therefor -- acid --;

TABLE II-3b,
Line 7, at "c." under "fumaric" column, delete "1" and insert therefor -- 112 --;

TABLE II-4b,
Line 3, at "b." under "benzoic" column, delete "475.4" and insert therefor -- 478.4 --;
Line 5, at "c." under first "fumaric" column, delete "2.57" and insert therefor -- 2.87 --;
Line 5, at "c." under second "fumaric" column, delete "22.55" and insert therefor -- 22.88 --;

TABLE II-6b,
Line 2, at "b." under second "fumaric" column, delete "104" and insert therefor -- 111 --;
Line 2, at "b." under "benzoic" column, delete "106" and insert therefor -- 104 --;
Line 2, at "b." under "Hyd. Veg. Oil" column, insert -- 106 --;

Column 31,
Lines 1-2, before "Ability of Aqueous Sugar-bearing Sources to Suspend Super Concentrations", insert the following two paragraphs:
-- It is important to note that the solubility of certain carboxylic acids increases dramatically with increasing temperature of the water. Such acids tend to be more useful in processes for which the heats of solution and/or neutralization increase the temperature sufficiently to help initially dissolve higher concentrations of carboxylic acid in an aqueous mixture. Process heating can be employed to increase the temperature of the starting materials and/or the mixtures formed during the process, subject to maintaining the mixtures within an acceptable temperature range during the mixing steps of the process. Of course, adding process heating would be expected to add to the processing costs, thereby detracting from some of the benefits of the process. According to the presently most preferred embodiments of the invention, no added process heating is issued or necessary. Nevertheless, it is anticipated that commercially viable processes using added heating of the starting materials and/or mixtures can be achieved within the parameters of the present invention.

UNITED STATES PATENT AND TRADEMARK OFFICE
CERTIFICATE OF CORRECTION

PATENT NO. : 6,126,986
DATED : October 3, 2000
INVENTOR(S) : Joseph M. Harris

It is certified that error appears in the above-identified patent and that said Letters Patent is hereby corrected as shown below:

It is also important to note the water solubility of the sales of the carboxylic acids, shown for sodium and calcium above. Except for the $C_1$-$C_3$ carboxylic acids salts, for which the solubilities of the salts are all very high, the solubilities of the rest of the carboxylic acids salts tend to be inverse of the solubility of the carboxylic acid. In other words, if the solubility of the carboxylic acid is low, the solubility of the salt of that particular acid tends to be much higher than that of the carboxylic acid, and vice-versa. This characteristic of carboxylic acids is particularly dramatic with the sodium salts and to a lesser extent with the calcium and ammonium salts thereof. The tendency of inverse solubilities between the acid and the conjugate salt presents one of the particular challenges of working with carboxylic acids and making their salts, except for the $C_1$-$C_3$ carboxylic acids. --

Column 31,
Line 22, delete "very";

Column 32,
Line 1, after "solution" insert -- to --;
Line 13, delete "have a" and insert therefor -- having an --;
Line 35, delete "C8" and insert therefor -- $C_8$;
Line 43, after" water" insert -- , and even it missed --;
Line 47, delete second occurrence of "does not" and insert therefor -- to --;

Column 34,
Line 9, delete "concentration" and insert therefor -- concentrations --.

Signed and Sealed this

Fourth Day of December, 2001

Attest:

*Nicholas P. Godici*

NICHOLAS P. GODICI
*Attesting Officer*     Acting Director of the United States Patent and Trademark Office